United States Patent
Hasegawa et al.

(10) Patent No.: US 6,288,891 B1
(45) Date of Patent: *Sep. 11, 2001

(54) MOVABLE DISPLAY APPARATUS

(75) Inventors: Masahide Hasegawa, Yokohama; Shouichi Ibaraki, Tokyo; Masahiro Ando, Yokohama, all of (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/972,330

(22) Filed: Nov. 18, 1997

(30) Foreign Application Priority Data

Nov. 21, 1996 (JP) .................................................. 8-324837
Jan. 29, 1997 (JP) .................................................. 9-015403

(51) Int. Cl.[7] ................................. G01F 1/16; H05K 7/16
(52) U.S. Cl. ........................................... 361/681; 248/923
(58) Field of Search ..................... 361/681, 682, 361/683, 680; 248/917, 918, 921, 922, 923; 267/64.12

(56) References Cited

U.S. PATENT DOCUMENTS

| 4,438,458 |   | 3/1984  | Münscher ........................ 358/254 |
| 4,669,694 | * | 6/1987  | Malick ............................ 248/397 |
| 5,308,174 | * | 5/1994  | Kuki ................................. 400/83 |
| 5,715,138 | * | 2/1998  | Choi ............................... 361/681 |
| 5,769,369 | * | 6/1998  | Meinel ........................... 248/176.1 |
| 5,799,917 | * | 9/1998  | Li ................................... 248/248.1 |
| 5,812,368 | * | 9/1998  | Chen et al. ...................... 361/681 |
| 5,842,672 | * | 12/1998 | Sweere et al. ................ 248/278.1 |
| 5,854,735 | * | 12/1998 | Cheng ............................. 361/681 |

* cited by examiner

Primary Examiner—Benjamin R. Fuller
Assistant Examiner—Jagdish Patel
(74) Attorney, Agent, or Firm—Fitzpatrick, Cella, Harper & Scinto

(57) ABSTRACT

A display apparatus includes a moving unit enclosing a display for displaying information, a base portion having an expandable supporting device for rotatably supporting the moving unit, and a supporting position control unit for controlling the supporting device at an arbitrary position. The supporting device is expanded or contracted synchronously with the rotation of the moving unit. A control unit for controlling the expansion and contraction of the supporting device is also provided. The control unit is a cam, a motor, or a gear.

14 Claims, 32 Drawing Sheets

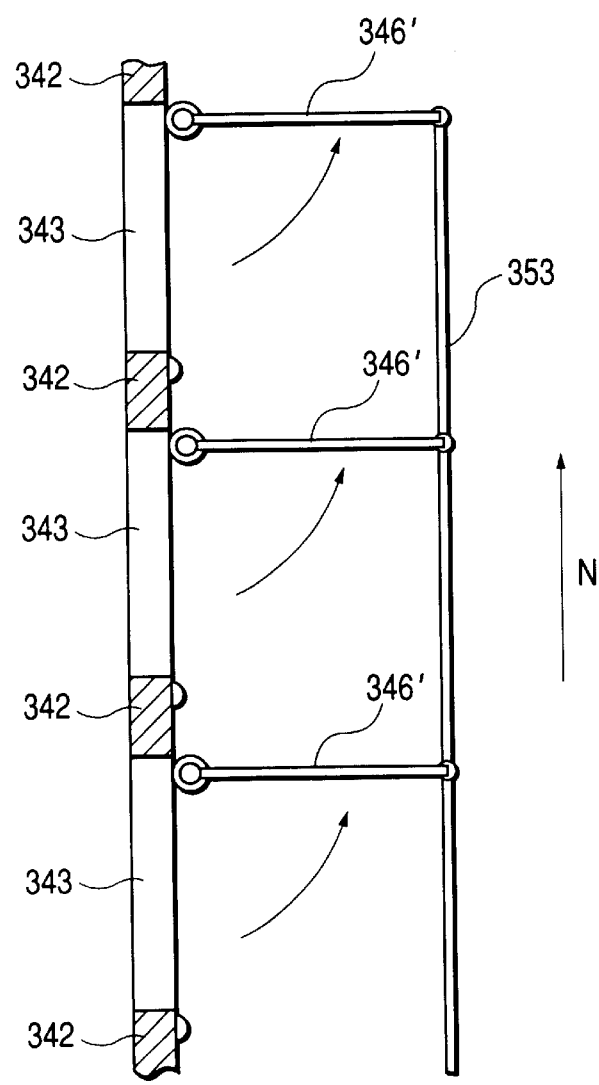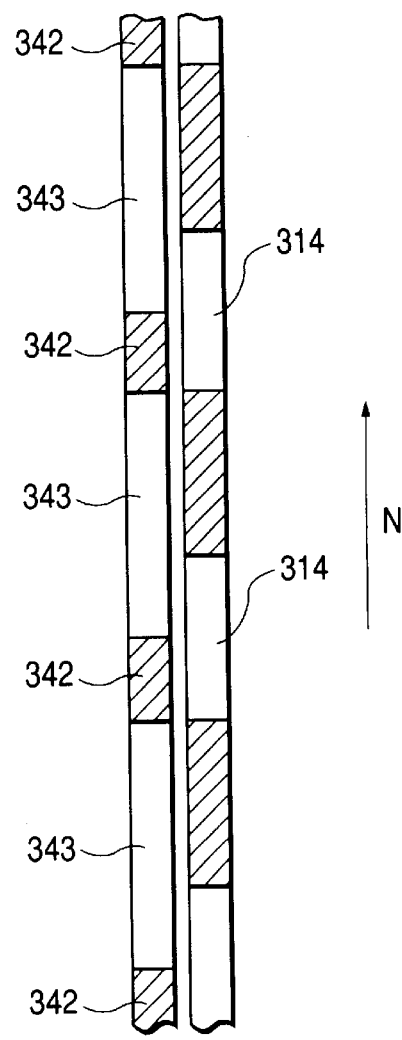

| FIG. | 30A | 30B | 30C |
|---|---|---|---|
| SW1 | OFF | ON | ON |
| SW2 | OFF | OFF | ON |
| FAN | OFF | LOW | HIGH |

| FIG. | 33A | 33B | 33C |
|---|---|---|---|
| SW1 | OFF | ON | ON |
| SW2 | OFF | OFF | ON |
| FAN | OFF | 1 UNIT | 2 UNITS |

MOVABLE DISPLAY APPARATUS

BACKGROUND OF THE INVENTION

1. Field of the Invention

The invention relates to a display apparatus having display means comprising, for example, a liquid crystal panel or the like.

2. Related Background Art

Hitherto, a display apparatus having a display unit comprising, for example, a liquid crystal panel or the like is constructed as shown in, for instance, FIG. 37. In the diagram, a display apparatus 500 is mainly made up of a display unit 501 comprising a liquid crystal panel or the like, a keyboard 502 to input information, and a main body 503 of the display apparatus.

In such a display apparatus, when inputting by the keyboard 502, the display unit 501 is provided for the operator to only look at the display contents. The display unit 501 is constructed so that it can be moved in directions A in the diagram.

As shown in FIG. 38, when inputting by an input pen 504, the display apparatus 500 fixes the display unit 501 to a position where the operator can easily input by using the input pen 504.

As shown in FIGS. 39, 40, and 41, the display apparatus 500 is constructed in a manner such that the position of the display unit 501 is changed by using connecting portions 506 and 507 as fulcrums, thereby changing from a form shown in FIG. 37 to a form shown in FIG. 38.

As such a kind of apparatus, the apparatus supported by a stand having a mechanism such that a tilting angle of a display screen can be varied in accordance with a body size or a posture of the user or an environment (light reflection of the external light or the like) of a use location is used. There is also an apparatus constructed so that a swiveling operation can be performed.

Particularly, in recent years, the realization of a large screen of a liquid crystal display device is progressing and a thin size of the apparatus has been realized. Therefore, in an apparatus such that the tilting operation is performed by setting a state in which the screen is almost vertical to the desk surface to a reference state in a manner similar to the CRT, in order to miniaturize an installation area, the depth dimension of a stand for supporting the screen is reduced. On the other hand, in an apparatus such that an inputting operation is performed by directly operating on the screen like a touch panel or a pen input apparatus, an apparatus in which an angle of screen lies within a range from a state where it is parallel with the desk surface to about 30° such that the operator can easily operate even in case of the desk-top type has been realized and is started to be put into practical use. In case of the CRT, although it is necessary to bury the CRT into the desk, such an angle could be realized owing to the thin size of the apparatus. As mentioned above, in case of the apparatus in which an angle of screen is set to a small angle, since a viewpoint of the user can be set to be downward, it is also desirable from a point of prevention of a visual disease such as a dry eyes or the like.

An apparatus using a rotary arm in such a display apparatus has been described in U.S. Pat. No. 4,438,458 issued Mar. 20, 1984 to Münscher. By using the rotary arm, an angle of screen can be varied from the horizontal state to an almost vertical state and a height can be also changed.

In a display apparatus having a display device made of liquid crystal or the like as mentioned above, particularly, in a display apparatus having a display device with a temperature dependency with respect to a display speed of liquid crystal or a luminance of a back light, it is necessary to suppress an increase in temperature in a casing enclosing the display apparatus as much as possible. For this purpose, a method of forcedly cooling by attaching a fan or a method of radiating by a natural convection is used.

However, the above conventional display apparatus has a problem such that it can be fixed to only two points of a position (FIG. 37) where it is used only for seeing the display contents and a position (FIG. 38) at the time of inputting by using the pen or the like, so that the display apparatus cannot be fixed to an arbitrary position between those two points.

However, the conventional apparatus has some inconveniences. That is, when the display screen is large in size, since a weight also increases, a large force is necessary to adjust the screen angle and there is a drawback such that it is difficult to use the apparatus. Even in a state in which the screen is made to stand vertically, an installation space on the desk corresponding to almost a length in vertical direction of the display unit is necessary. In order to vertically put the apparatus in a folded state, it is necessary to once lift up the main body and it is inconvenient in case of the apparatus with a large size. When the angle of screen is changed, since the center of gravity moves forward and backward, a stability is also insufficient. Moreover, if the weight is especially large and a moving force is large, there is a fear such that a finger or the like of the user is sandwiched between the rotary arm and a base seat portion or a display unit and the user is seriously externally wound. There is, consequently, a problem on safety. Further, in case of an apparatus for directly inputting onto the screen by using a pen or a finger, since a pressing force is applied onto the screen surface, it is necessary to fix the screen in a state in which the tilting angle is variably set so as not to move the screen during the operation. However, there is not any apparatus having such a function.

In case of inclining and using the casing, since a flow of air in the casing changes depending on the angle of inclination, there is a fear such that an internal temperature changes and a desired temperature control cannot be performed. In such a case, a method of providing a fan with a temperature sensor is also considered. However, such a fan results in an increase in costs. Since a parameter for an on/off control of the fan is only a temperature, the fan continuously rotates in accordance with the temperature. In dependence on a use form, there is also a case where even if a display speed, a luminance, or the like of liquid crystal is sacrificed, it is difficult to stop the fan and to realize an electric power saving or silence. Further, a case where an obstacle is produced in front of an air exhaust port depending on an angle of the casing is also considered. That is, the temperature control cannot be properly performed depending on the position of the casing enclosing the display apparatus, so that there is a problem such that the temperature change cannot be suppressed.

SUMMARY OF THE INVENTION

The invention is made to solve the above problems and it is a first object of the invention to provide a display apparatus which can fix display means to an arbitrary position (angle).

It is a second object of the invention to realize a cheap, small, and light-weighted desk-top type display apparatus in which a tilting angle can be varied and fixed by a small force from a screen angle from a state that is parallel with the desk surface to about 30° at which the screen can be easily seen and which is suitable to an inputting operation to the screen to a screen angle which is almost vertical to the desk surface where an installing area is small and which is suitable when enclosing or to the use only for a display.

It is a third object of the invention to enable a tilting operation to be more smoothly performed and to realize a smooth swiveling operation.

It is a fourth object of the invention is to provide a display apparatus which can suppress a temperature change in a casing irrespective of a position of the casing, namely, an angle of inclination.

It is a fifth object of the invention to further realize a miniaturization of the apparatus.

To accomplish the above objects of the invention, there is provided a display apparatus comprising a moving unit having therein display means for displaying information and a base portion having supporting means for rotatably supporting the moving unit, wherein the display apparatus also has supporting position control means for controlling the supporting means to an arbitrary position.

To accomplish the above objects according to the invention, there is provided a display apparatus comprising a moving unit having therein display means for displaying information and supporting means for rotatably supporting the moving unit, wherein the moving unit has an opening portion provided on the moving unit and air rectifying means which is closable at a position where it faces the opening portion in accordance with an inclination angle of the moving portion for the supporting means.

To accomplish the above objects according to the invention, there is further provided a desk-top type display apparatus comprising: a flat-plate like display unit in which a display screen is provided on one side; a rotary arm one end of which is rotatably axially supported to a rear surface of the display unit; a base seat portion in which the other end of the rotary arm is rotatably axially retained and which has a bottom surface to be put on a desk; a phase control mechanism for controlling a rotational phase of the rotary arm for the display unit and a rotating position for the base seat portion so as to have a predetermined relation; and a braking mechanism for fixing a rotational phase which is controlled by the phase control mechanism at an arbitrary phase position in a rotatable range, wherein the display unit is rotated and moved almost around a virtual center in front of the display screen.

Or, there is also provided a desk-top type display apparatus comprising: a flat-plate like display unit in which a display screen is provided on one side; a rotary arm one end of which is rotatably axially supported to a slider which is supported to a rear surface of the display unit so that it can be linearly moved; a base seat portion in which the other end of the rotary arm is rotatably axially retained and which has a bottom surface to be put on a desk; a phase control mechanism for controlling in a manner such that the rotary arm rotates in accordance with a linear motion of the slider and, further, a rotational phase of the rotary arm for the base seat portion changes synchronously with the rotation of the rotary arm; and a braking mechanism for fixing a rotational phase which is controlled by the phase control mechanism at an arbitrary phase position in a rotatable range, wherein the display unit is rotated and moved almost around a virtual center in front of the display screen.

BRIEF DESCRIPTION OF THE DRAWINGS

FIG. 28 is a diagram showing connecting relations among a closing lever, a casing, and a fin shown in FIG. 27;

FIG. 29 is an explanatory diagram showing an opening mechanism of the radiating holes which is used for a display apparatus according to the sixth embodiment of the invention;

DETAILED DESCRIPTION OF THE PREFERRED EMBODIMENTS

[First Embodiment]

Figure 1:
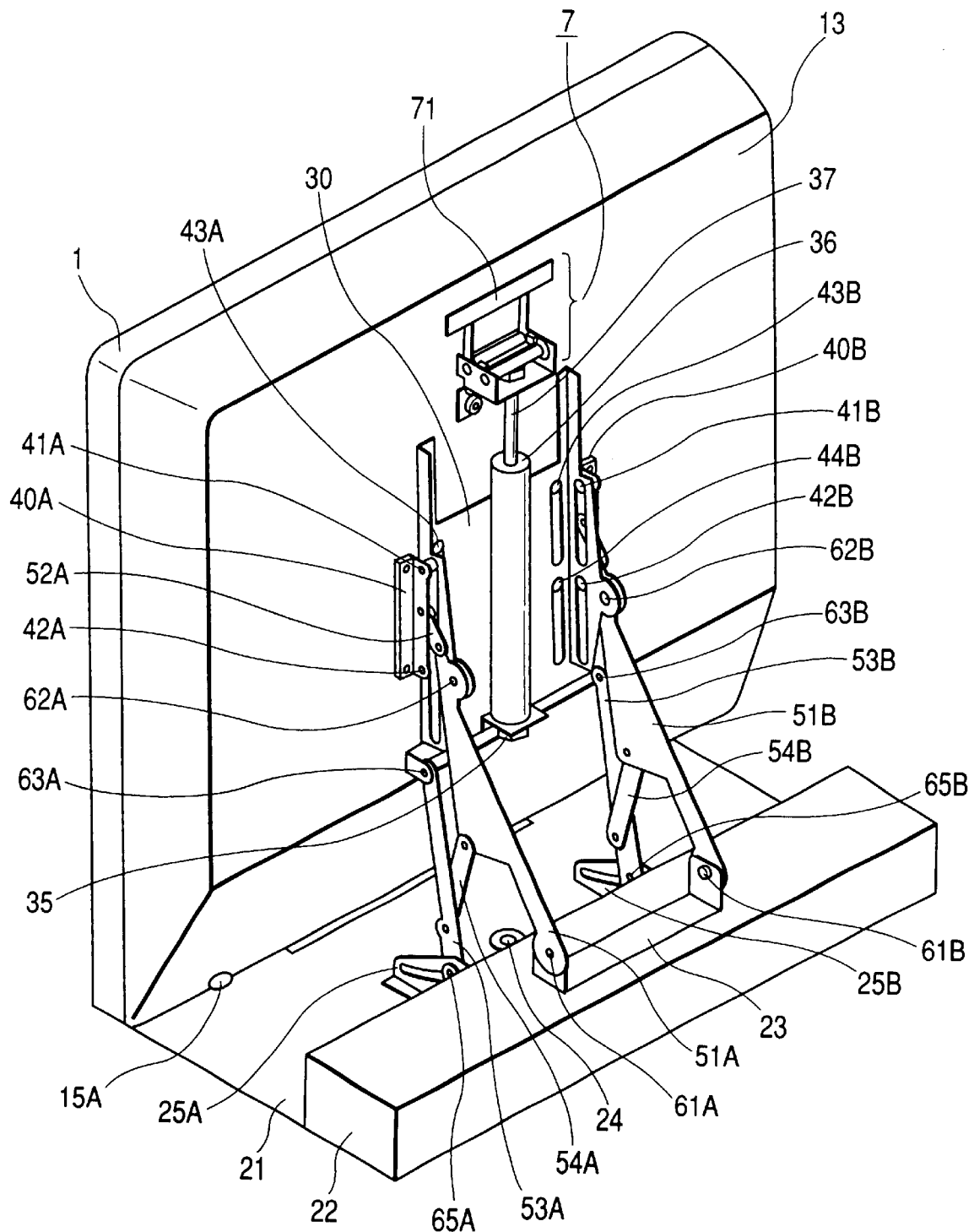
FIG. 1 is a perspective view of an internal mechanism of a desk-top type display apparatus according to the first embodiment of the invention.

FIG. 1 is a diagram showing most preferably a feature of a display apparatus according to the invention and is a perspective view of a state in which a cover is removed so that an internal mechanism can be easily seen and a screen is made stand vertically. The apparatus is shown in a state in which electric functional parts such as wirings, connectors, and the like are omitted so that a mechanism portion can be easily seen. The same shall also apply to the subsequent embodiments.

In the diagram, a display unit 1 has therein a display screen and is restricted by rollers (41A, 42A) and (41B, 42B) which are attached to pins 43A, 43B, 44A (not shown), and 44B and roller bases 40A and 40B which are provided on a rear surface 13. A slider 30 is smoothly moved in only the vertical direction within a predetermined range. An expansion rod 37 on the opposite side of a gas spring 36 one end of which is fixed to a projecting portion 35 provided for the slider 30 is fixed to an unlocking unit 7 provided for the rear surface 13 of the display unit. Thus, the position of the slider 30 is restricted by a length of the expansion rod.

The gas spring 36 has therein a locking mechanism which is often used in a chair with a height adjusting function or the like. As is well known, according to such a kind of spring device, by depressing a projection of a front edge portion of a rod, a channel of an internal fluid is switched, thereby unlocking the locking state and making a spring force effective. In the embodiment, the locking state can be released by pressing a lever 71 of the unlocking unit 7. The spring force of the gas spring 36 is set to a value which is almost balanced to a weight of display unit 1 or a slightly strong value. Therefore, even in the unlocking state, the screen does not fall and its position can be changed in any one of the upper and lower directions by a relatively small operating force. As compared with a case of lifting up the screen, the user can easily apply a force in case of the pushing down operation. Therefore, a slightly strong force is desirable.

First rotary arms 51A and 51B are symmetrically rotatably attached to the slider 30 with respect to the right and left positions by axes 62A and 62B. The other ends of the rotary arms 51A and 51B are rotatably attached to a projecting portion 23 fixed to a chassis 21 of a base seat portion 2 by axes 61A and 61B. The rotary arms 51A and 51B rotate around the axes 62A and 62B synchronously with the movement of the slider 30 due to the operations of levers 52A and 52B (not shown) for coupling the rotary arms 51A and 51B and the roller bases 40A and 40B. Since the axes 62A and 62B are provided for the slider, the rotation of the rotary arm for the display unit 1 is substantially similar to the use of a longer arm in which a position where the arm is inserted to the display unit 1 side is used as a center. This rotation provides a function to reduce the motion in the front/rear direction of the locus of the center of gravity of the display unit, which will be explained hereinlater.

Further, the above rotation changes positional relations between the rollers 65A and 65B attached to levers, or second rotary arms, 53A and 53B and the axes 61A and 61B by the operation of a 4-node link constructed by levers (53A, 54A) and (53B, 54B). The rollers 65A and 65B are restricted to cams 25A and 25B provided for the chassis 21. Therefore, phases of the rotary arms 51A and 51B for the display unit 1 and phases of the rotary arms 51A and 51B for the chassis 21 are restricted to a predetermined relation by the position of the slider 30. That is, the foregoing link mechanism and cam mechanism construct a phase control mechanism to control the rotational phases of the rotary arms 51A and 51B for the display unit 1 and the rotational phases of the rotary arms 51A and 51*b* for the base seat portion 2 to a predetermined relation. The rotational phases of the display unit 1—rotary arms 51A and 51B—base seat portion 2 which are controlled by the phase control mechanism are fixed at an arbitrary phase position in a rotatable range by fixing the length of the expansion rod 37 to restrict the position of the slider 30 by a locking mechanism of the gas spring 36. That is, a locking mechanism of the gas spring 36 serves as a braking mechanism to fix the display unit 1 at a desired rotating position.

Although a power supply unit 22 is attached to the chassis 21, wirings and the like are not shown in the diagrams as mentioned above. The wiring from the power supply unit 22 to the display unit 1 can be twisted in the portions of the axes 61A and 61B and the portions of the axes 62A and 62B along the rotary arms 51A and 51B. It will be obviously understood that it is sufficient to arrange the wirings so that the motion of the slider 30 can be absorbed by a bending shape and to arrange a signal line for display and an output signal line when the apparatus has a coordinate input function to the screen so as to pass along the same path. As for the installing positions and shapes of the electric parts such as those wirings, connectors, and the like including the power supply unit 22, it is sufficient to use a space so as not to obstruct the operations of the mechanisms. Since they are not directly concerned with the essence of the invention, their detailed descriptions are omitted here. When considering a large tilting operation angle and a swiveling operation, it will be obviously understood that it is desirable to pull out the wirings to the outside from the base seat portion. Particularly, since a weight of the power supply unit is relatively large, it should be noted that a layout in which the power supply unit is located not in the display unit but in the base seat portion for the purpose of stabilization of the whole apparatus and a structure such that the power supply unit is arranged at a rear position than the front position of the chassis as shown in the embodiment is further desirable.

Figure 2:
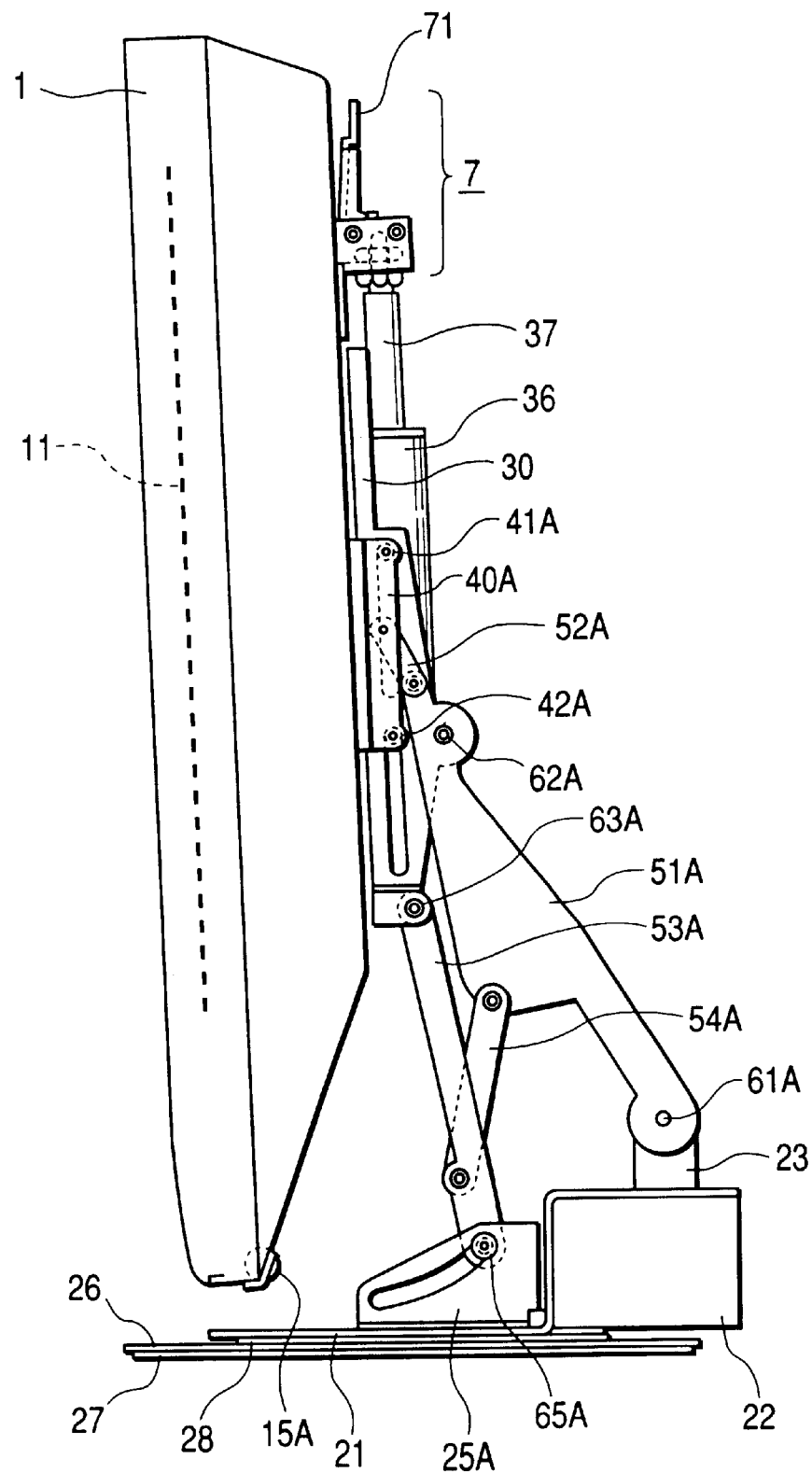
FIG. 2 is a side elevational view of the internal mechanism of a desk-top type display apparatus according to the first embodiment of the invention, in which a tilting angle is changed.
Figure 3:
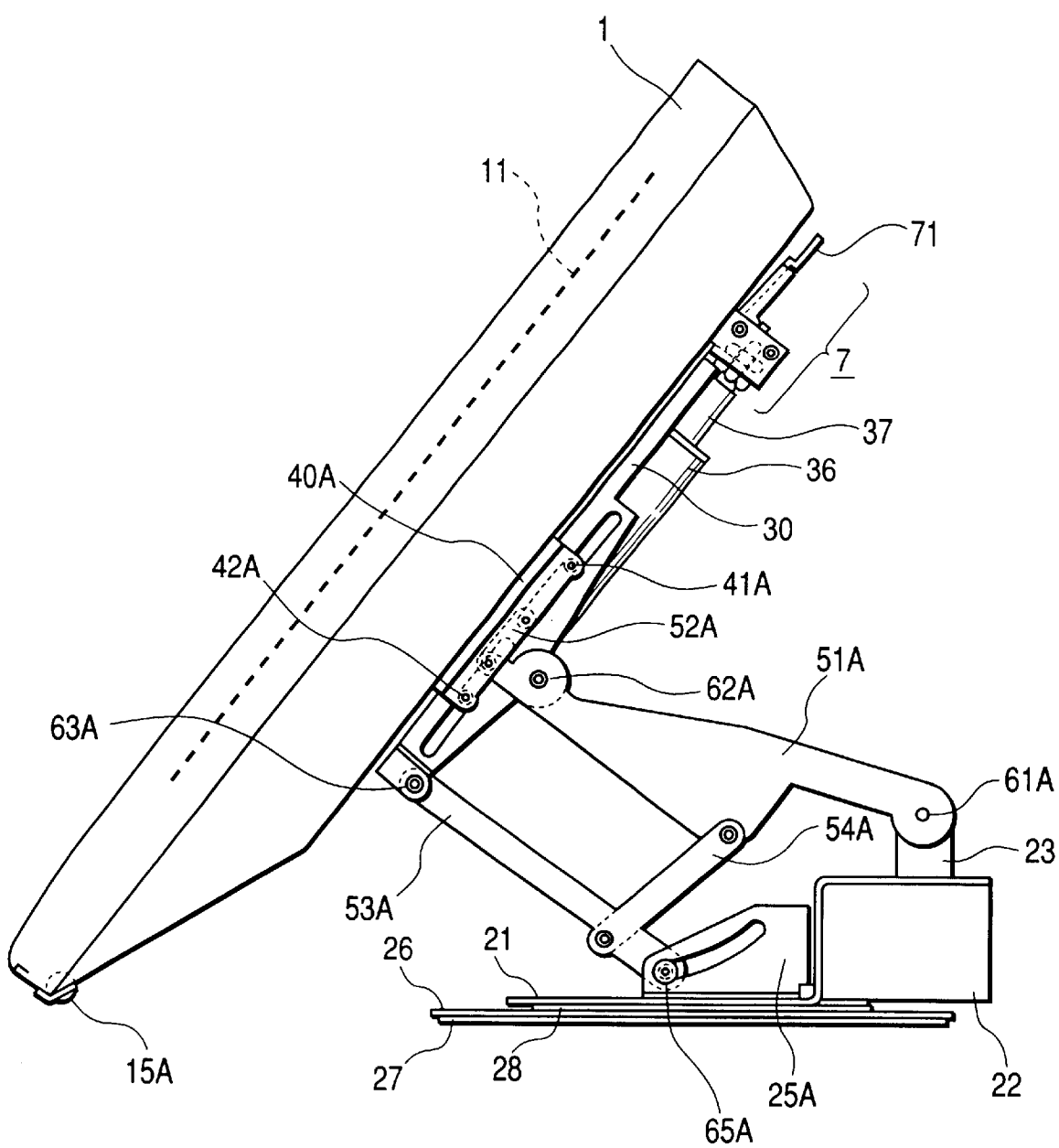
FIG. 3 is a side elevational view of the internal mechanism of a desk-top type display apparatus according to the first embodiment of the invention, in which the tilting angle is changed.
Figure 4:
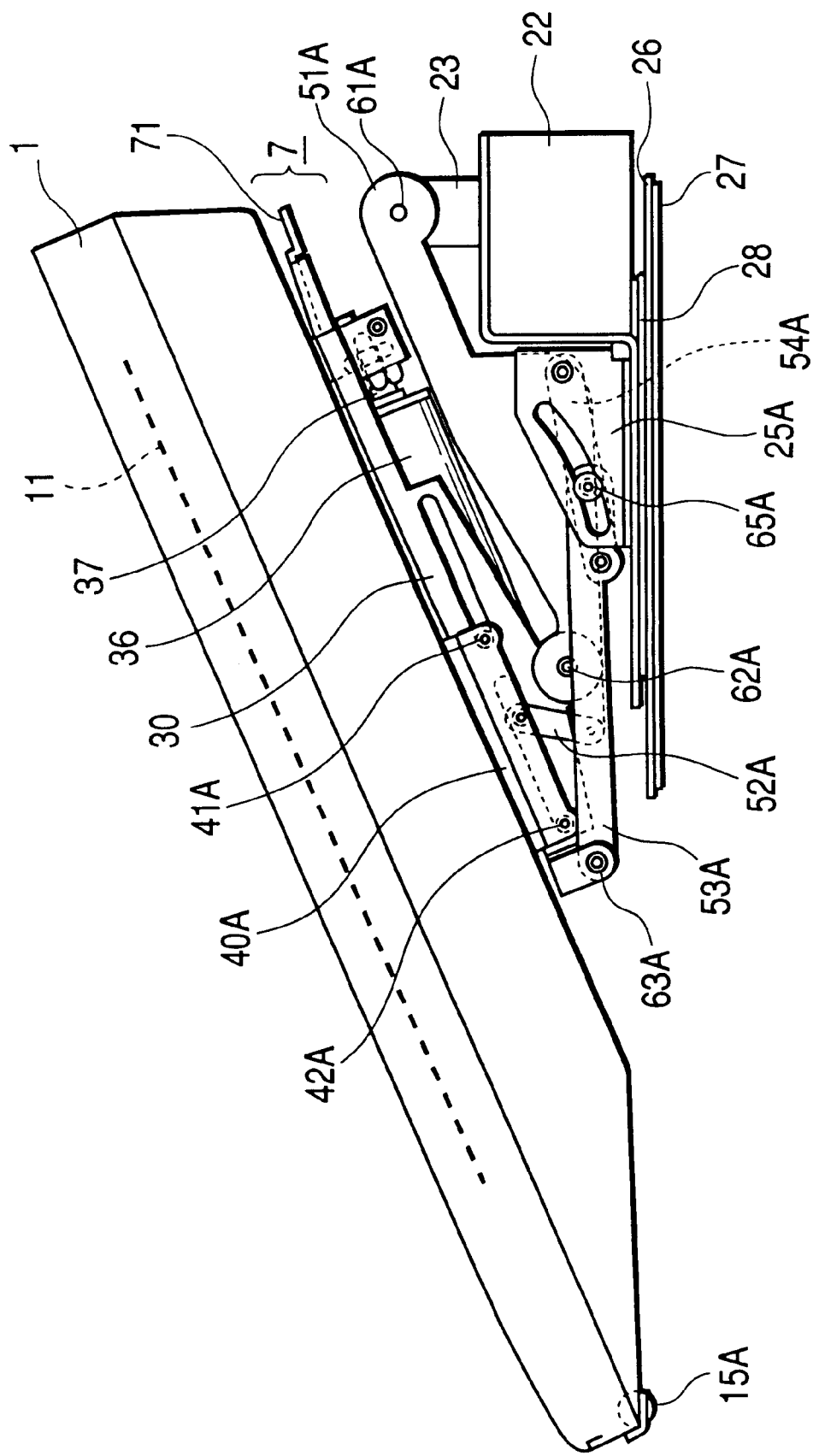
FIG. 4 is a side elevational view of the internal mechanism of a desk-top type display apparatus according to the first embodiment of the invention, in which the tilting angle is changed.

The tilting operation will now be described further in detail with reference to FIGS. 2 to 4. The diagrams are right side elevational views. FIG. 2 shows an almost vertical state in a manner similar to FIG. 1. FIGS. 3 and 4 show states in which the display unit is inclined at angles of about 45° and about 20°, respectively. From the state of FIG. 2, when the rod 37 is contracted, the slider 30 moves and the rotary arm 51A is rotated by the coupling lever 52A. Thus, the 4-node link comprising the slider 30, rotary arm 51A, and levers 53A and 54A operates and the roller 65A existing at the tip of the lever 53A moves in the cam 25A. In FIG. 3, the roller 65A is moved to the other end of the cam 25A. Further in FIG. 4, the roller 65A is moved in the direction where it is slightly returned. The cam 25A has a shape connecting an arc and its tangential line in the embodiment. However, such a shape is a design item and the invention is not limited to such a shape. It will be understood that the position of the display unit can be controlled by setting a proper cam shape together with the dimensions of each portion and the positional relations among them.

Two ball-shaped casters 15A and 15B (not shown) are provided in a lower edge portion of the display unit 1. A thickness on the lower edge side serving as a front side of a screen 11 is set to be thin so that the display unit can be easily used when it is set to an angle of about 20° as shown in FIG. 4.

Figure 5:
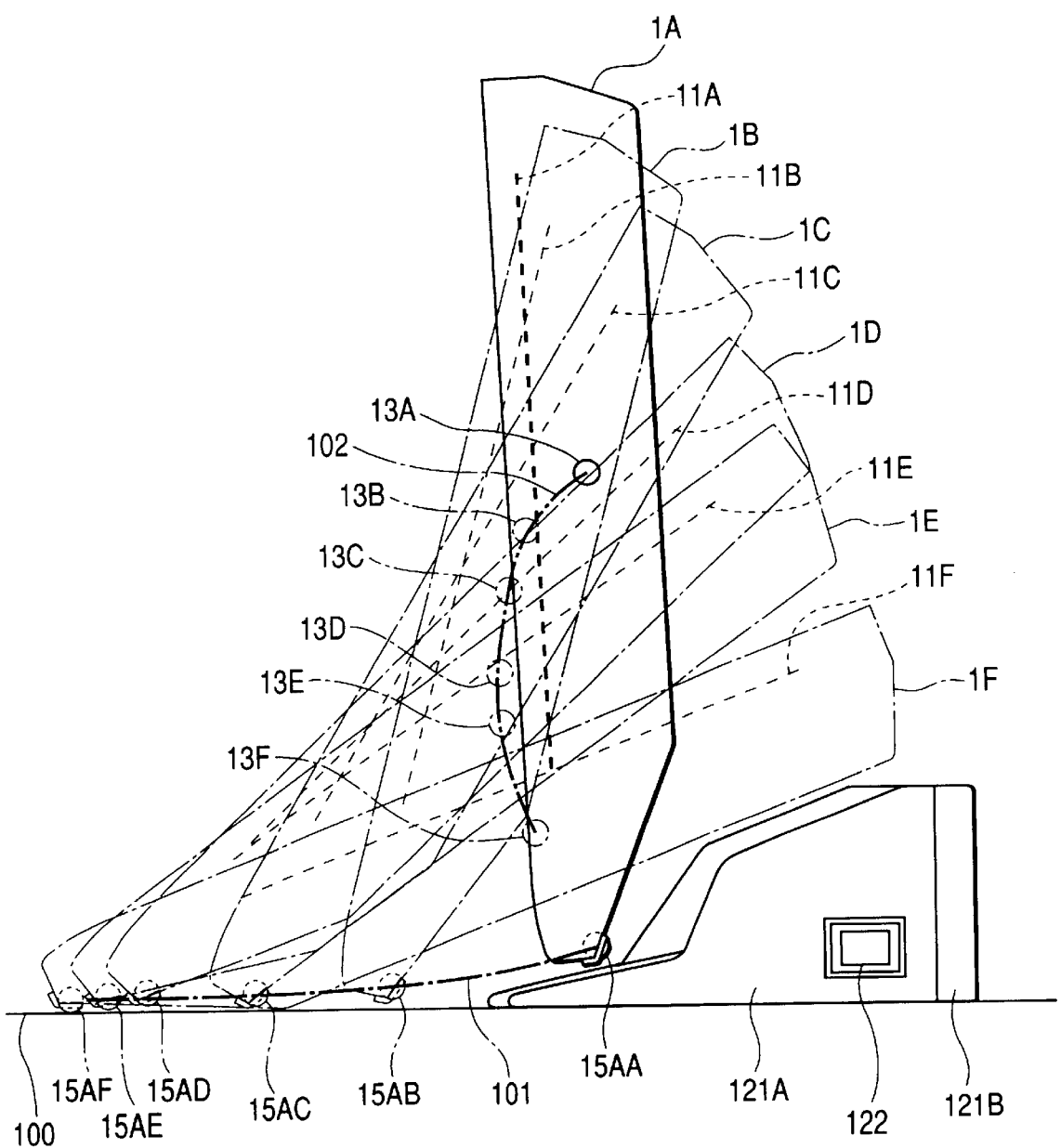
FIG. 5 is a side elevational view showing a locus of a tilting operation of the desk-top type display apparatus according to the first embodiment of the invention.

FIG. 5 shows a multiple-state in which several halfway states of the operation in the embodiment are overlapped and drawn. A curve 101 shows a locus of the ball-shaped casters 15A and 15B. It will be understood that the display unit moves along the position that is slightly over a desk surface 100 where the base seat portion 2 is put on and its position can be smoothly changed. A curve 102 shows a locus of centers of gravities 13A to 13F of the display unit 1 when the display unit 1 moves as shown by display units 1A to 1F in the diagram. It will be understood that the movement in the front/rear direction is small and is stable. Although the motions of screens 11A to 11F are not perfect, it will be understood that they are close to an arc motion and a change in visual range from the eyes of the observer in front of the screen is small. Further, the depth dimension of the apparatus is reduced into about the half at an angle of about 90° as compared with that at an angle of about 20°. It will be understood that an effect of saving an installing space can be accomplished owing to the flat display.

Figure 6:
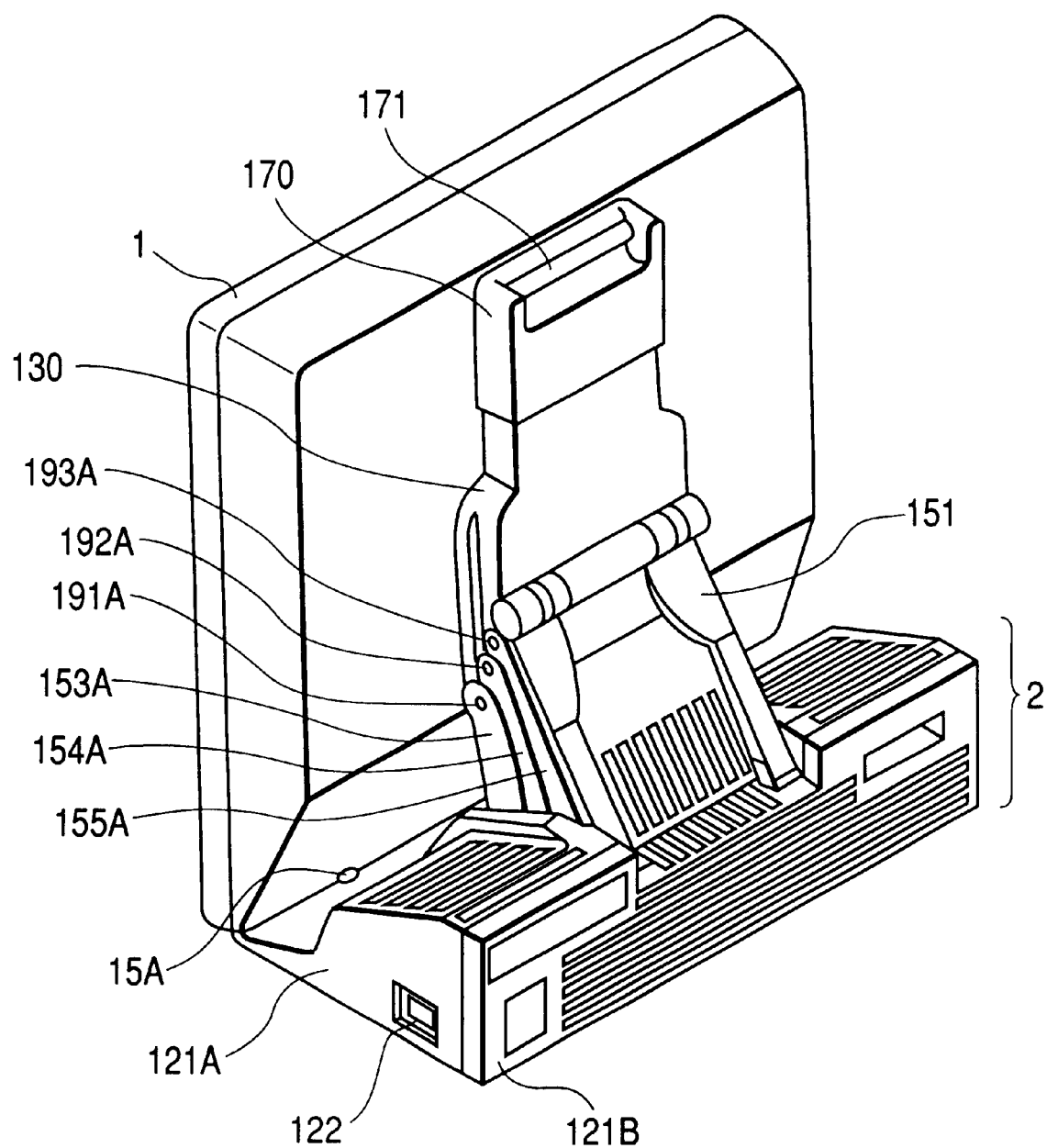
FIG. 6 is an external perspective view of the desk-top type display apparatus according to the first embodiment of the invention.
Figure 7:
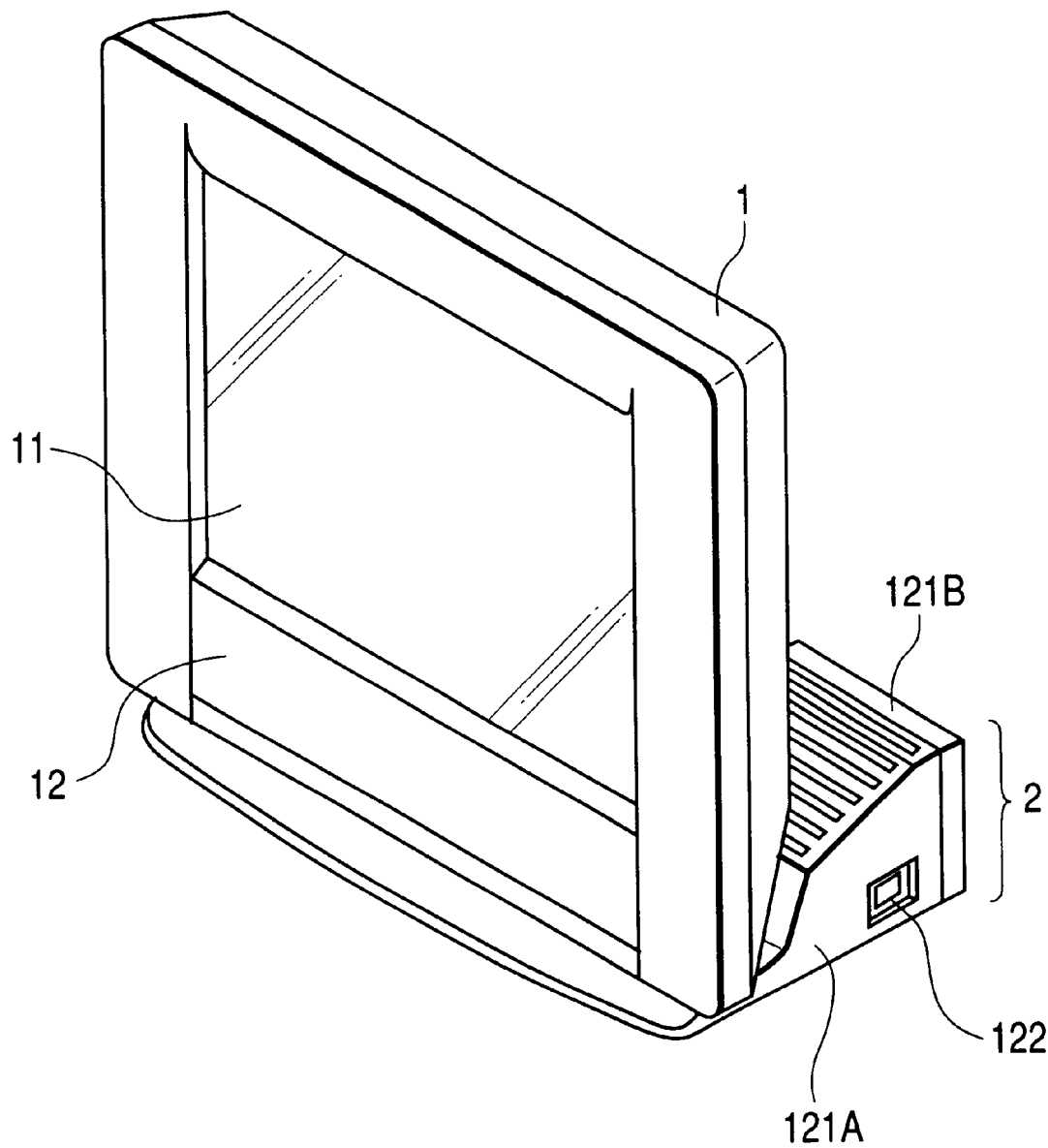
FIG. 7 is an external perspective view of the desk-top type display apparatus according to the first embodiment of the invention.
Figure 8:
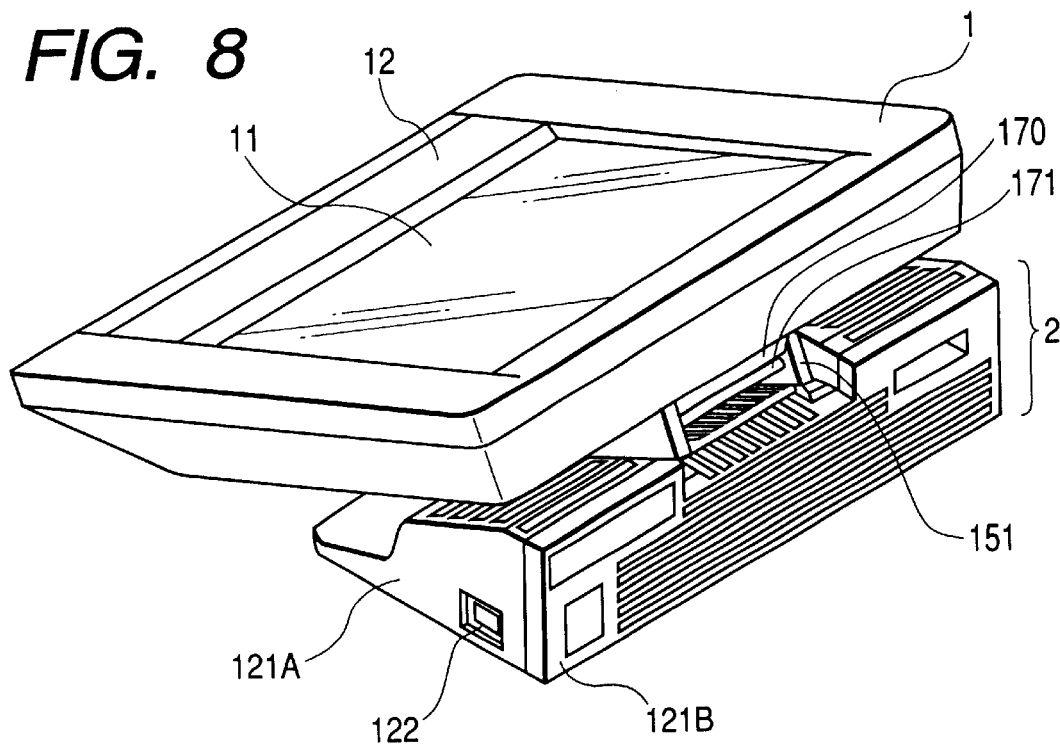
FIG. 8 is an external perspective view of the desk-top type display apparatus according to the first embodiment of the invention.
Figure 9:
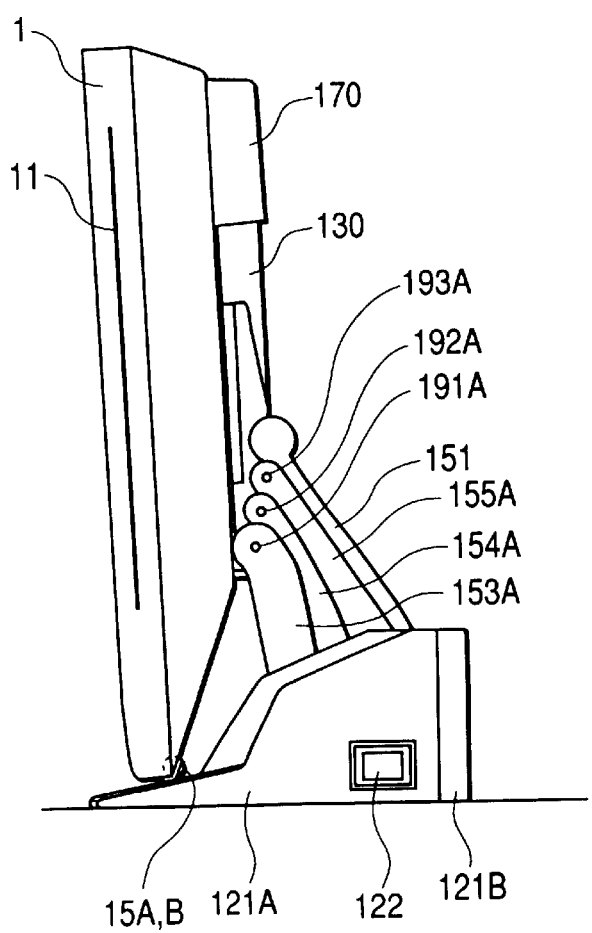
FIG. 9 is an external side elevational view of the desk-top type display apparatus according to the first embodiment of the invention, in which the tilting angle is changed.
Figure 10:
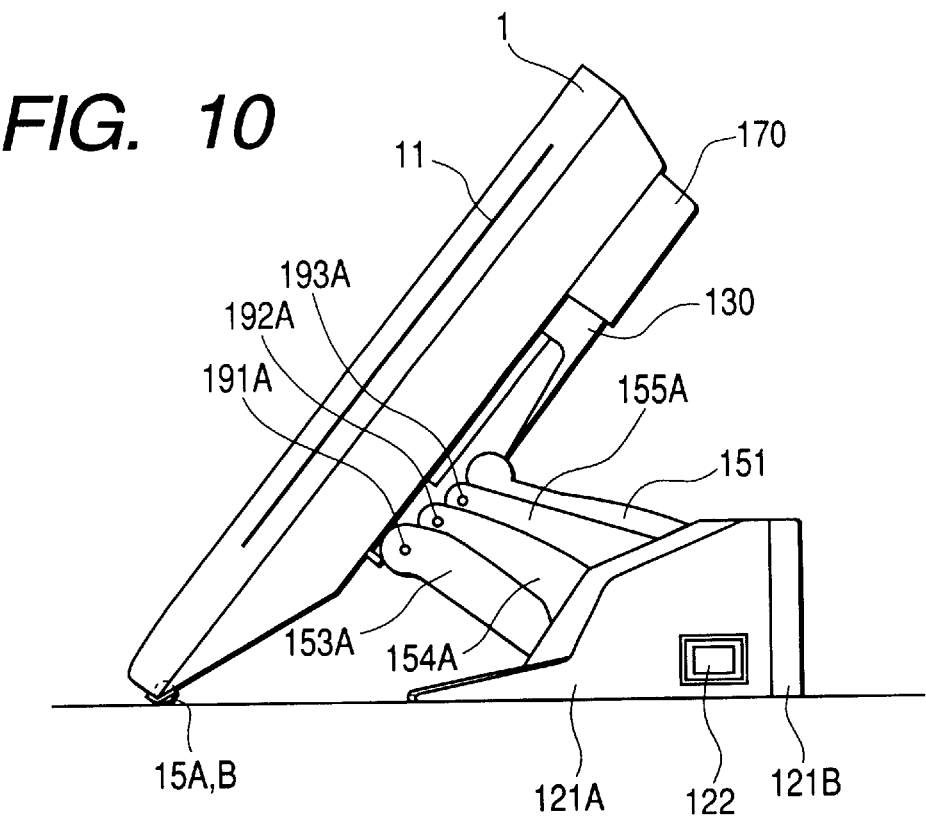
FIG. 10 is an external side elevational view of the desk-top type display apparatus according to the first embodiment of the invention, in which the tilting angle is changed.
Figure 11:
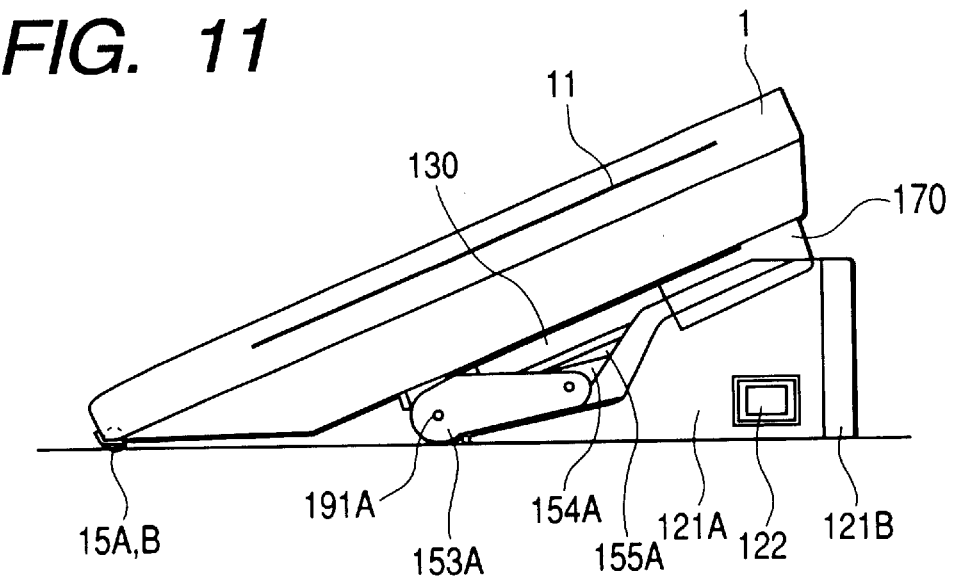
FIG. 11 is an external side elevational view of the desk-top type display apparatus according to the first embodiment of the invention, in which the tilting angle is changed.

FIGS. 6 and 7 are perspective views showing a state in which the display apparatus with a cover in the embodiment is made to stand almost vertically. FIG. 8 is a perspective view of a state in which the display apparatus is inclined at about 20°. FIGS. 9 to 11 are side elevational views showing states in which the display apparatus is inclined at about 90°, 45°, and 20°, respectively.

In FIGS. 7 and 8, a cover 12 to cover an adjusting button and the like of a luminance of the screen and the like is provided in the lower portion of the screen 11 of the display unit 1. Particularly, when the screen is laid almost horizontally and used, even if the hand is put on the screen, the display unit is not erroneously operated. In particular, there is an apparatus in which a transparent touch panel or digitizer is integratedly formed on the display screen and an inputting operation is directly performed onto the screen by using a finger or a pen. The invention is especially suitable for such an input integrated type display apparatus. However, the operation to lay the screen almost horizontally as shown in FIGS. 8 and 11 is not limited to the case where the display unit is of the input integrated type. Even in case of a mere display apparatus like an embodiment, its use efficiency can be also remarkably improved.

Since the foregoing internal mechanism executes the sliding operation or rotating operation, a cover to cover the internal mechanism is also provided so as not to restrict those operations. A slide cover 130 is attached to the slider 30 on the rear side of the display unit 1. An arm cover 151 is attached to the rotary arms 51A and 51B. The unlocking unit 7 is covered by a locking cover 170 and is attached so that a lock release button 171 can depress the lever 71. On the other hand, the base seat portion 2 is covered by a front cover 121A and a rear cover 121B to cover the chassis 21. The power supply unit 22 is attached to the base seat portion 2 and can be operated by a power button 122. A number of slits formed in the surface of the front and rear covers 121A and 121B are provided to radiate heat from the power supply unit 22.

As will be understood from FIGS. 2 to 4, since an opening portion of the 4-node link portion constructed by the rotary arms 51A and 51B and levers (53A, 54A) and (53B, 54B) is deformed, there is a fear such that a finger or the like is erroneously sandwiched and the operator is externally wounded. To prevent it, three reed screen-shaped flat cover blades (153A, 154A, 155A) on the left side and three reed screen-shaped flat cover blades (153B, 154B, 155B (which are not shown)) on the right side are attached to prevent such a fear. The cover blades 153A and 153B are attached to the levers 53A and 53B so as to rotate around fulcrums 191A and 191B (not shown), as centers, which are coaxial with axes 63A and 63B. The cover blades 154A, 154B, 155A, and 155B are attached to fulcrums 192A, 192B (not shown), 193A, and 193B (not shown) provided for the slide cover 130 and fulcrums 194A, 194B, 195A, and 195B (which are not shown) provided for the levers 54A and 54B, respectively. Thus, as shown in FIGS. 9 to 11, the cover blades 154A, 154B, 155A, and 155B also execute a link operation, thereby making it possible to prevent the occurrence of a gap. Thus, the foregoing danger can be perfectly prevented.

Figure 12:
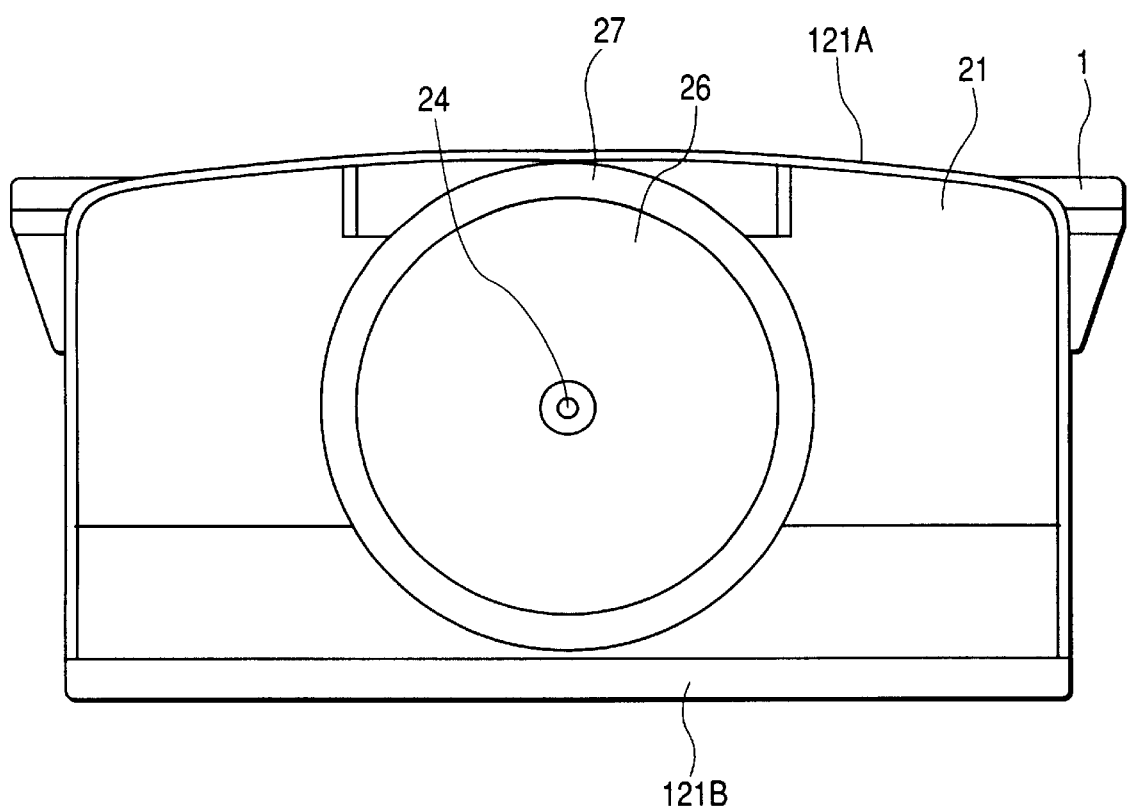
FIG. 12 is a bottom view of the desk-top type display apparatus according to the first embodiment of the invention.
Figure 13:
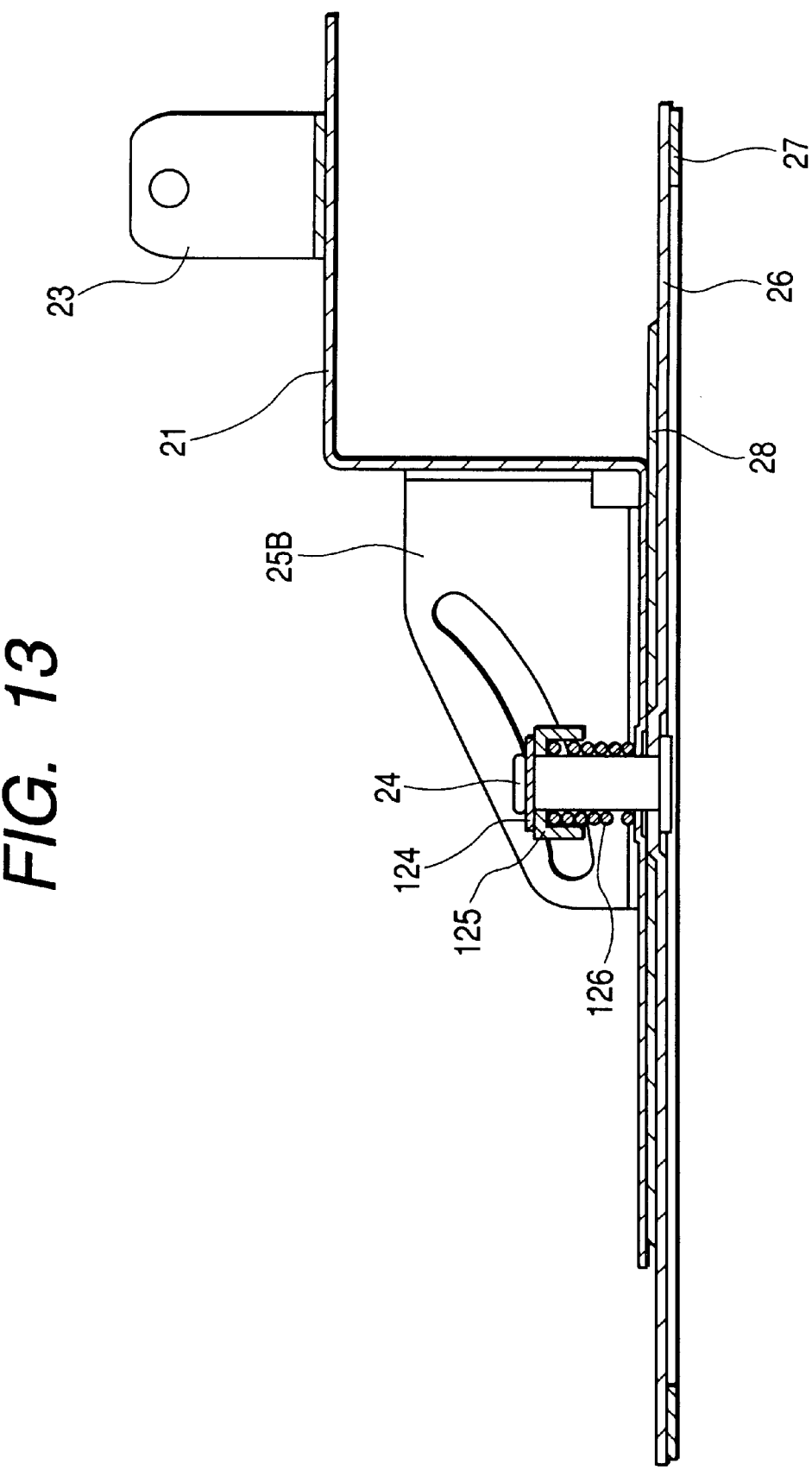
FIG. 13 is a cross sectional view of a swiveling mechanism of the desk-top display apparatus according to the first embodiment of the invention.

The swiveling operation will now be described with reference to FIGS. 1 to 4, 12, and 13. FIG. 12 is a bottom view. FIG. 13 is a cross sectional view of a surface passing through a center rotary shaft 24 in a state in which the tilting mechanism members such as covers, rotary levers, and the like of the base seat portion 2 are removed. A rotating base plate 26 is attached by a spring 126, a spring seat 125, and a snap ring 124 by the shaft 24 penetrating the center hole of the chassis 21. The rotating base plate 26 is pressed to the chassis 21 by a predetermined force of the spring 126. A member 28 with an abrasion resistance is adhered to the slide surface. A grounding member 27 made of a rubber is adhered to the floor surface side on the opposite side of the member 28. The rubber grounding member 27 prevents the floor surface from being scratched and makes it difficult for the rotating base plate 26 to slide on the floor. Therefore, since the rotating base plate 26 does not slide even if the user pushes the display unit 1 or base seat portion 2 by the hand, the position of the apparatus is held stable. When a torque around the rotary shaft 24 increases to a certain extent, the member 28 and chassis 21 slide, so that the display unit 1 and base seat portion 2 integratedly perform the swiveling operation. Since an operating force in this instance is determined by a pressing force of the spring 126, a proper operating force can be applied due to a stability of the apparatus and an easiness of the operation. Particularly, in the state in which the screen is laid almost horizontally, there can be a case where the lower edge of the display unit comes into contact with the floor during the swiveling operation in dependence on concave and convex surfaces of the floor or a rigidity of the apparatus. At this time, since the ball casters 15A and 15B are attached as mentioned above, even in such a case, a smooth motion can be derived and a possibility such that the floor is scratched can be also reduced.

In the embodiment, the locking mechanism is not provided for the swiveling mechanism and the apparatus can operate at a constant torque. However, a locking mechanism using gears or the like can be also obviously provided.

According to the display apparatus of the embodiment as described above, by moving the display unit 1 for the slider portion 30, the relative position between the slider portion 30 and display unit 1 changes and a rotation of the display unit in which the axes 62A and 62B are used as a center is provided by such a positional change. Therefore, when the display unit 1 is tilted from an almost vertical state to the state in which the display unit is laid on the desk, the display unit 1 operates so that the center shaft moves downward while almost rotating and moving around a virtual center axis existing in front of the screen near the center in the vertical direction. By this operation, even if the display unit is fixed at any angle, the position of the center of gravity thereof hardly changes. Therefore, an installation area of the base seat portion can be set to a size according to the change in position of the center of gravity in, particularly, the depth direction. The display apparatus can be miniaturized.

By using the slider, a large motion can be realized by a smaller apparatus.

Since the casters are provided in the corner portions which move near the desk surface in association with the rotation of the display unit 1, the tilting operation can be more smoothly performed.

Further, by providing the swiveling mechanism for the bottom surface of the base seat portion, the smooth swiveling operation can be performed.

Since the link mechanism is used as a phase control mechanism, most of the component parts can be formed by press parts and the prime cost of the manufacturing can be made cheap.

[Other Embodiments]

As an example in which each functional unit of the display apparatus in the foregoing first embodiment is replaced to another unit, a metal spring can be also used instead of the gas spring 36. In this case, although a braking mechanism or a locking mechanism is separately necessary, any device as well as a belt brake can be applied. It is also possible to use a mechanism such that a few holes are simply formed and pins are come into engagement therewith, thereby locking at a few positions. It is also possible to easily form a structure of an electrically driven type by using a linear driving mechanism such as ball screws or the like.

A guide member of the slider is not limited to the roller but a rail guide or the like can be also used. In brief, it is sufficient that an enough rigidity can be provided.

The rotary arms can be also attached to the display unit instead of attaching to the slider. When they are attached to the slider, the substantial rotational center of the arms is set to the direction in the display unit and it is advantageous in terms of a miniaturization of the apparatus or a movement of the center of gravity upon tilting. When the rotary arms are directly attached to the display unit, although there is a limitation such that a tilting angle range is slightly narrowed or the like, there is also an advantage on costs such that the number of parts can be reduced or the like.

Although the system such that the rotation of the arms is synchronized by the link mechanism has been shown, those skilled in the art would be able to easily presume that a similar operation can be performed by combining mechanical elements such as cam, gear, belt, and the like.

It is an essence of the present invention that the angular relations among the rotary arms, the display unit, and the base seat portion are concerned with one another by the mechanical elements, thereby allowing the display unit to perform a motion that is close to the rotational motion around the virtual center in front of the screen. Various mechanical elements can be used.

Although the reed screen-shaped member has been used as a cover member to cover the phase control mechanism portion in the foregoing example, a flexible cover made of a rubber, a cloth, or the like or bellows can be also used. Or, it is not always necessary to perfectly cover the phase control mechanism portion but a mesh-like cover or a blind cover which is made of a plurality of wires or the like and is thinner than the finger can be also attached.

In brief, it is sufficient to make it difficult to come into contact with a portion of the lever which performs a motion like scissors. A proper device can be used in consideration of a movable range, a requirement on design, an easiness of assembly, and the like.

The shape of caster is not limited to the ball shape. A roller or a double-wheel type which is used for a chair or the like can be also used. Particularly, in the case where an enough rigidity is obtained or the swiveling mechanism is not provided, the casters can be also omitted.

According to the embodiment as described above, it is possible to realize a cheap, small, and light-weighted desktop type display apparatus in which a tilting angle can be varied and fixed by a small force from a screen angle from a state that is parallel with the desk surface to about 30° at which the screen can be easily seen and which is suitable to an inputting operation to the screen to a screen angle which is almost vertical to the desk surface where an installing area is small and which is suitable when enclosing or to the use only for a display.

By providing the casters for the display unit, the tilting operation can be more smoothly performed.

Further, by providing the swiveling mechanism for the bottom surface of the base seat portion, the smooth swiveling operation can be performed.

[Second Embodiment]

The second embodiment of the invention will now be described with reference to FIGS. 14 to 18.

Figure 14:
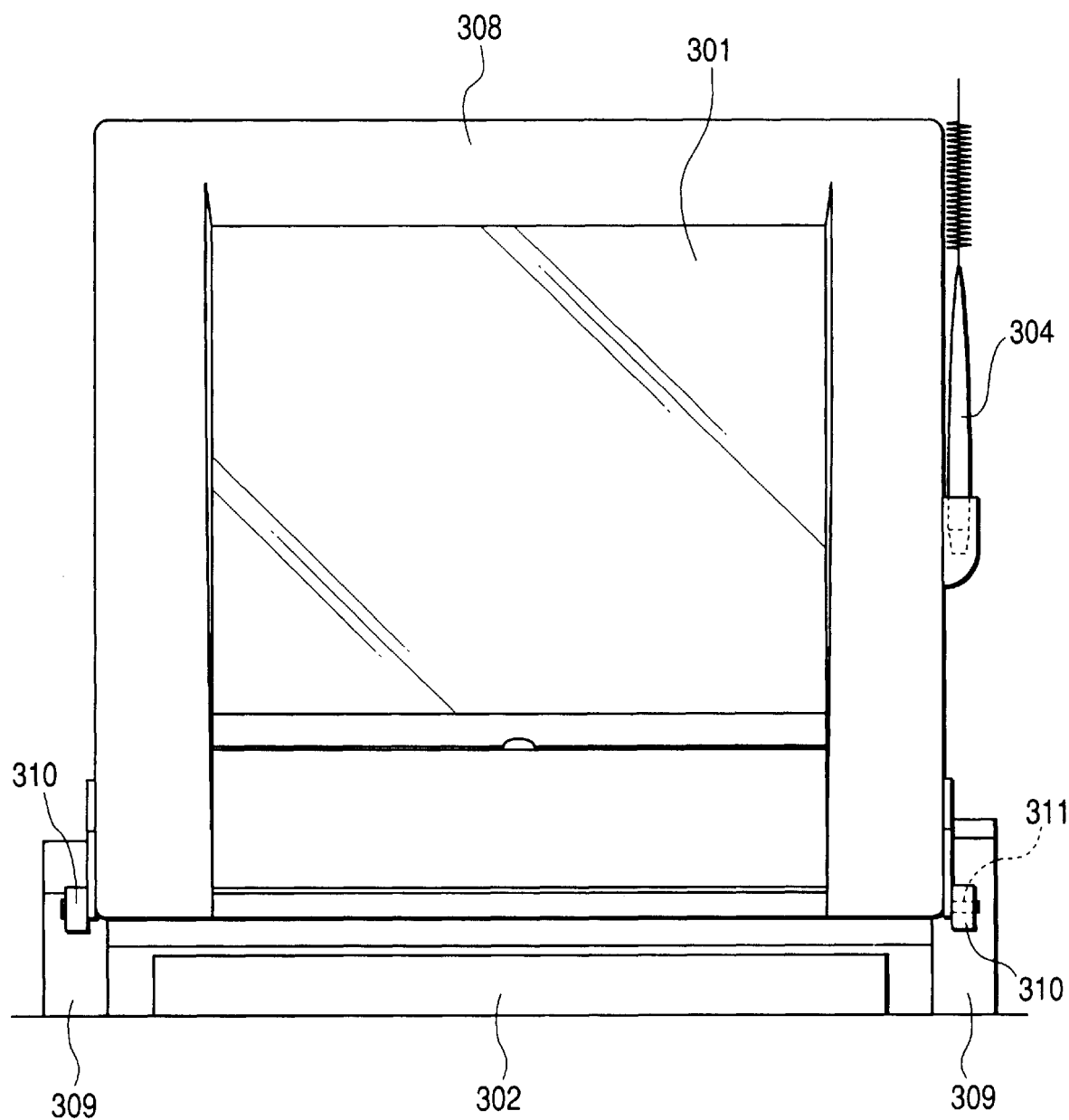
FIG. 14 is a block diagram showing a construction of a display apparatus according to the second embodiment of the invention.

FIG. 14 is a block diagram (front view) showing a construction of a display apparatus according to the embodiment. In the diagram, reference numeral 301 denotes a display unit serving as display means with a flat surface comprising, for example, a liquid crystal panel or the like; 302 a keyboard to input information such as characters or the like; and 304 an input pen for inputting information such as characters or the like. The operator can input various information to the display apparatus by using the keyboard 302 and can also input information by using the input pen 304.

Reference numeral 308 denotes casing serving as a moving unit enclosing the display unit 301; 310 guide rollers which are provided on the right and left sides of a lower portion of the casing 308 and function as lower supporting means for supporting the casing 308 when an angle position of the display unit 301 is changed; 309 guide plates which are used to guide the guide rollers 310; and 311 rotary shafts (roller shafts) of the guide rollers 310.

FIGS. 15 to 18 are side elevational views of the display apparatus shown in FIG. 14 and show changes in position of the display unit 301 in the display apparatus.

In the diagrams, reference numeral 312 denotes a stopper to suppress the downward movement of the casing 308. The stopper is provided in an upper portion of the guide plate 309.

Reference numeral 319 denotes a main gear to control the position of the casing 308. The main gear 319 is constructed so as to rotate around a main gear axis 325 as a center axis. The main gear 319 is fixed to one end of a slide rail 321. A pole 320 is provided to move the display unit 301. One end of the pole is fixed to one end of the slide rail 321. The pole 320 and slide rail 321 construct supporting means.

Reference numeral 323 denotes a cam serving as control means for controlling an expansion and a contraction of a distance between the casing 308 and main body 303. The cam 323 is constructed so as to rotate by using a cam axis 324 as a rotational axis.

The slide rail 321 mutually couples the main gear 319 and pole 320 and is in engagement with a cam groove 323a of the cam 323 on a slide rail axis 322.

The cam 323 and main gear 319 are driven by a motor 313. Reference numeral 314 denotes a motor gear which is directly coupled to the motor 313; 315 a gear which rotates by using an axial gear 316 as a rotational axis and is used to drive the main gear 319; 317 a gear which rotates by using an axial gear 318 as a rotational axis and is in engagement with the gear 315; and 328 eyes of the operator who operates the display apparatus. The component elements 313 to 319 and 323 to 325 construct supporting position control means for fixedly supporting the pole 320 and slide rail 321 serving as supporting means to a desired position and control means for controlling the expansion and contraction of the supporting means. The supporting position control means and the control means are enclosed in a stand cover 326.

In the above construction, when a current is supplied to the motor 313 and the motor 313 starts to rotate in the direction shown by an arrow B, its rotation is transferred to the motor gear 314 directly coupled to the motor 313, so that the motor gear 314 rotates. When the motor gear 314 rotates, the main gear 319 rotates in the direction shown by an arrow D by using the main gear axis 325 as a rotational axis. Thus, the slide rail 321 and pole 320 directly connected to the main gear 319 start to rotate in the direction of an arrow E.

The gear 315 which is in engagement with the motor gear 314 starts to rotate and the gear 317 which is in engagement with the gear 315 also starts to rotate. These rotations are transferred to the cam 323, so that the cam 323 rotates in the direction of an arrow F by using the cam axis 324 as a rotational axis. When the cam 323 rotates, the slide rail axis 322 starts to move along the cam groove 323a. A fulcrum 327 rotates so as to gradually reduce the distance between the main gear axis 325 and fulcrum 327.

Figure 15:
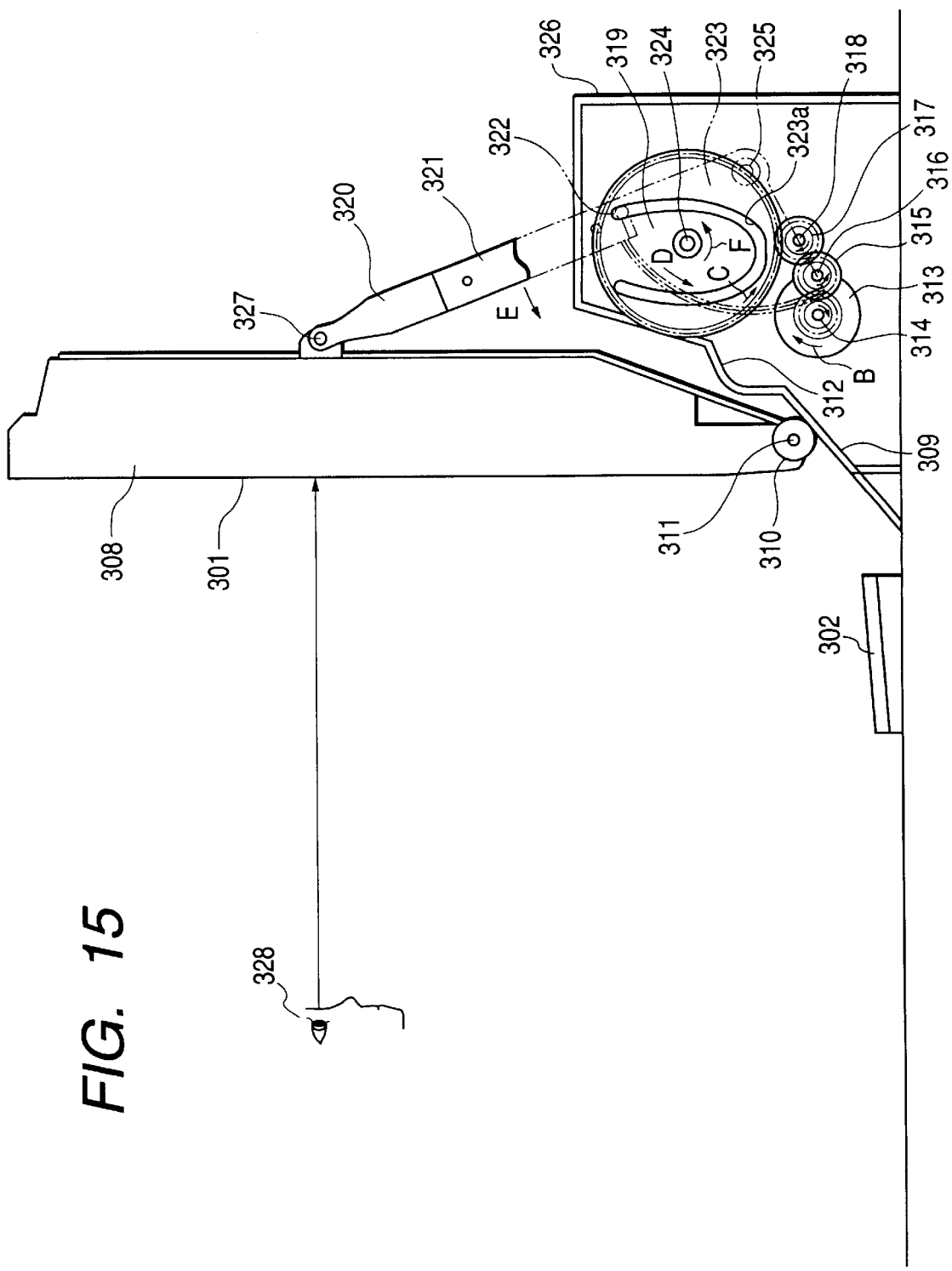
FIG. 15 is an external side elevational view showing a change in position of a casing including a display unit in the display apparatus shown in FIG. 14.

When the motor gear 314 further continues the rotation, the cam 323 and main gear 319 further rotate and the distance between the fulcrum 327 and main gear axis 325 is further reduced by the operations of the slide rail axis 322 and cam groove 323a. In this manner, the position of the casing 308 enclosing the display unit 301 is moved (FIG. 15→FIG. 16).

During the movement, the guide roller 310 rotates while supporting the casing 308 by the lower edge and moves along the guide groove 309. For a period of time during which the display unit 301 is moved from the state of FIG. 15 to the state of FIG. 16, the operator needs to perform the operation for allowing the keyboard 302 to pass through a space under the casing 308 and for enclosing it into the stand cover 326. Thus, when the casing 308 moves downward by the guide roller 310, the display unit can move without any obstacle such as a keyboard 302.

Figure 16:
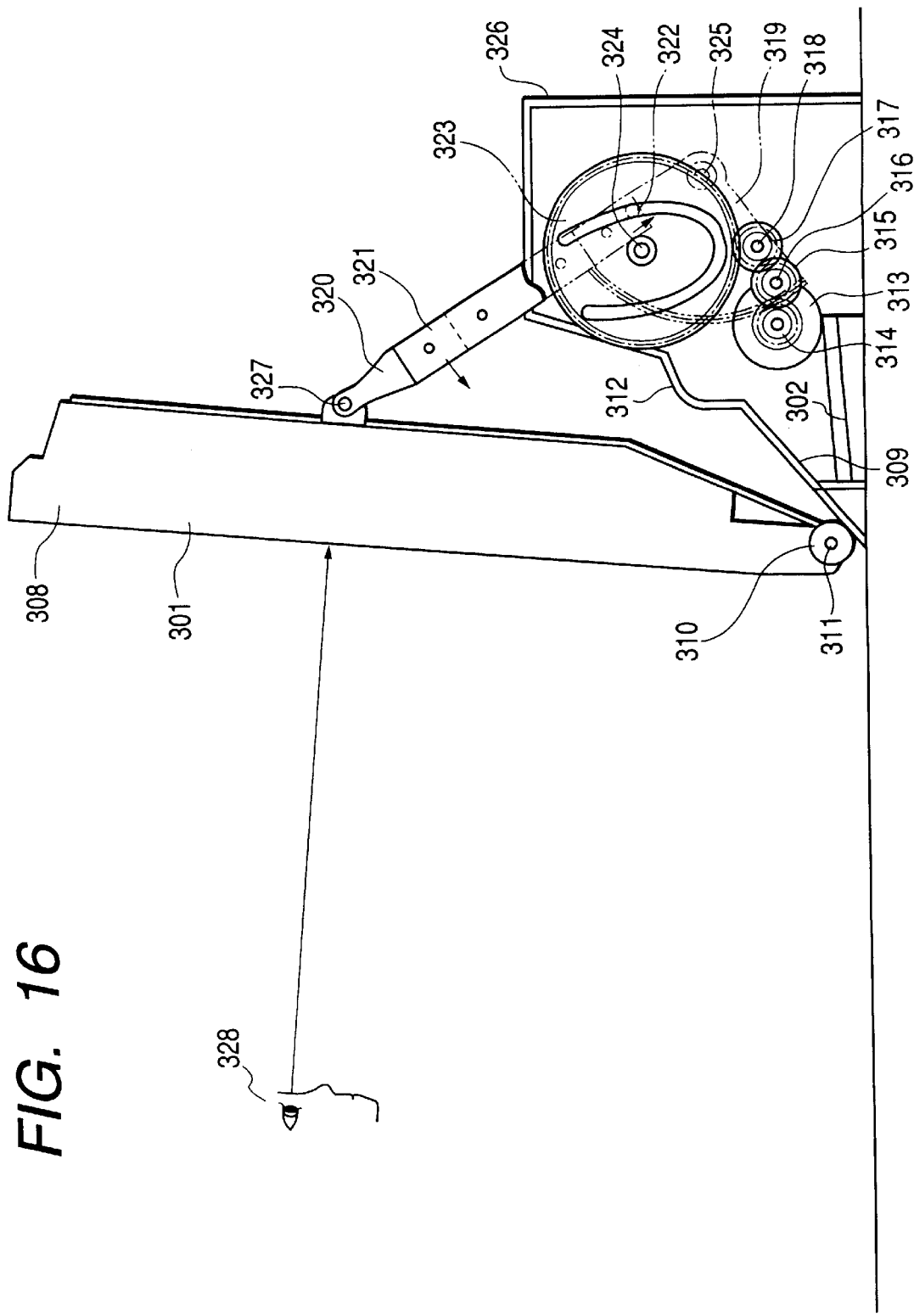
FIG. 16 is an external side elevational view showing a change in position of the casing including a display unit in the display apparatus shown in FIG. 14.
Figure 17:
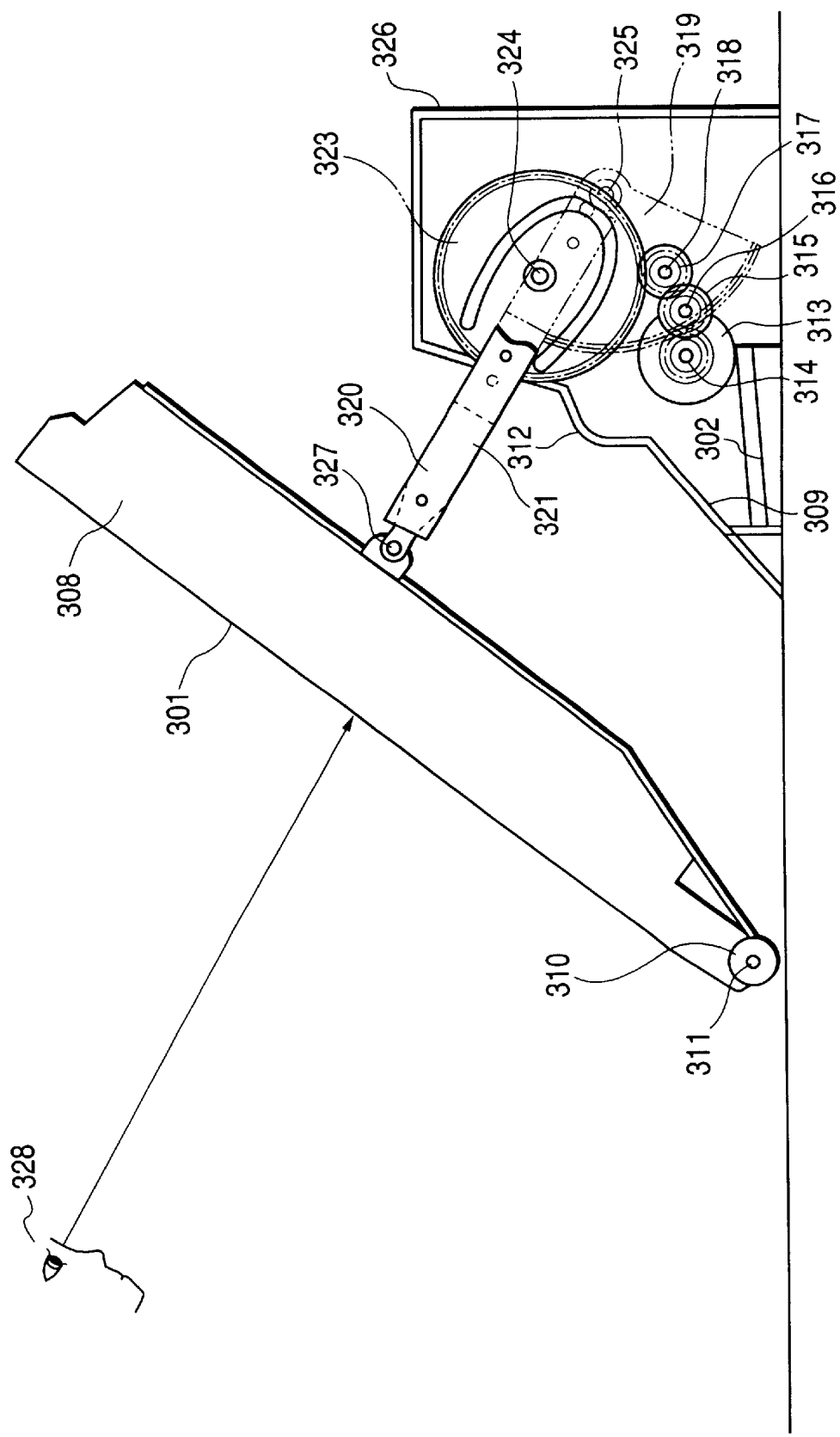
FIG. 17 is an external side elevational view showing a change in position of the casing including the display unit in the display apparatus shown in FIG. 14.

FIG. 17 shows a state in which the motor gear 314 further rotates from the state of FIG. 16 and the position of the display unit 301 moves. At this time point, the distance between the fulcrum 327 and main gear axis 325 becomes shortest. The guide roller 310 continues the rotation and is guided by the guide plate 309 and moves further forward.

Figure 18:
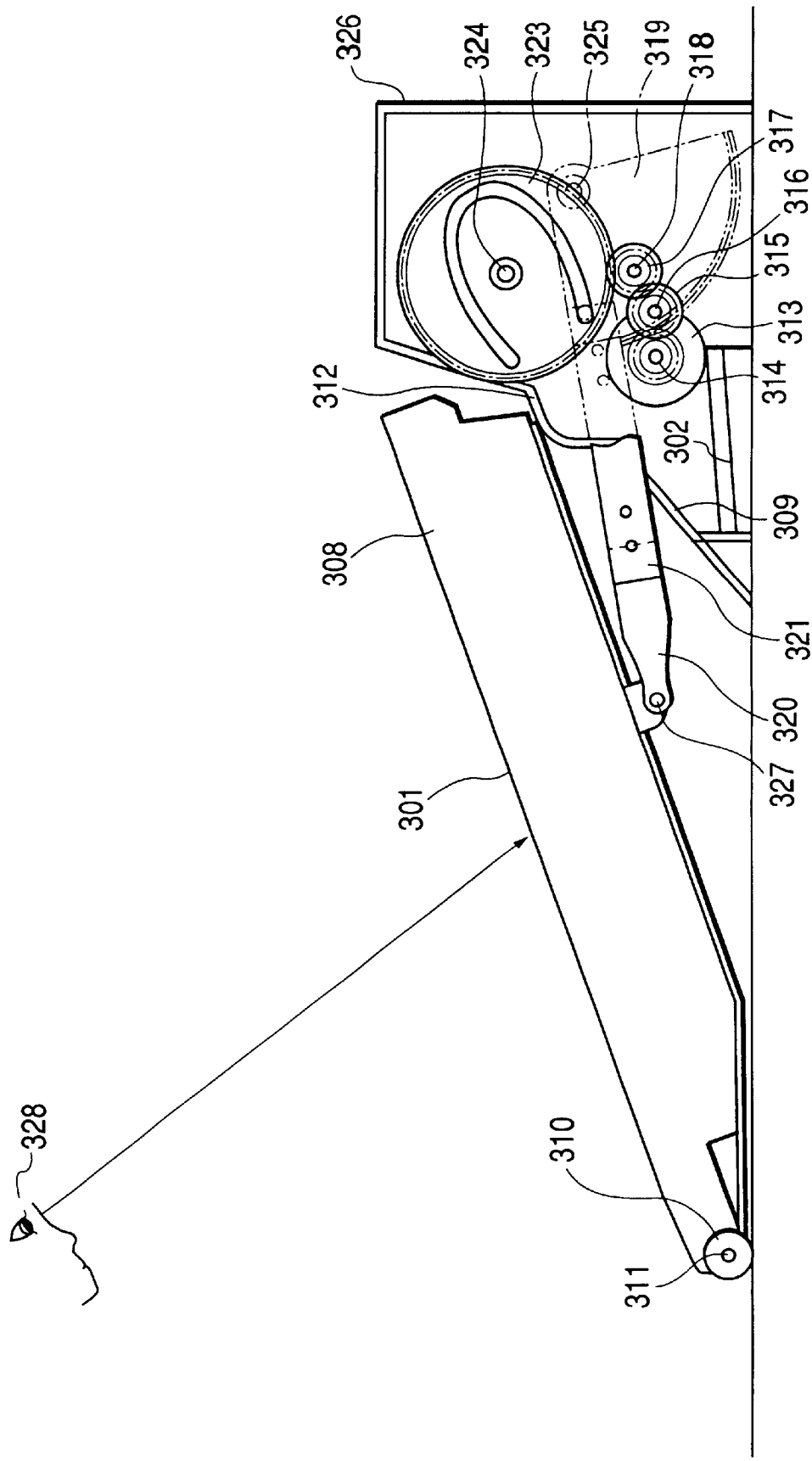
FIG. 18 is an external side elevational view showing a change in position of the casing including a display unit in the display apparatus shown in FIG. 14.

FIG. 18 shows a state in which the casing 308 exists at a position (maximum angle position) where the angle between the display apparatus and the casing 308 becomes maximum. In this state, the stopper 312 functions as a stopper of an upper portion of the casing 308 and prevents the whole display apparatus from falling down when a pressing force is applied to the display unit 301 by the input pen 304 or the like. The distance between the fulcrum 327 and main gear axis 325 is longer than those in the states shown in FIGS. 16 and 17. That is, the supporting means comprising the pole 320 and slide rail 321 operates so as to expand or contract synchronously with the movement of the casing 308.

In this state, when the current supply to the motor 313 is shut off by a switch (not shown), the rotation of the motor gear 314 is stopped and the rotations of the main gear 319 and cam 323 are also stopped. That is, the position of the casing 308 is fixed. When a switch (not shown) is again depressed and the current supply to the motor 313 is started, the casing 308 enclosing the display unit 301 starts to move toward a position (minimum angle position) where the angle between the main body 303 of the display apparatus and casing 308 becomes minimum.

That is, between the minimum angle position and the maximum angle position, the current supply to the motor 313 is shut off by depressing a switch (not shown) at an arbitrary timing and the operations of the motor 313, motor gear 314, and main gear 319 are stopped, so that the position of the casing 308 can be stopped at an arbitrary angle position.

As described above, according to the embodiment, the position of the casing 308 can be fixed at an arbitrary angle position by controlling the current supply to the motor 313.

Since the display unit 301 rotates always along almost an arc shape in which the eyes 328 of the operator are set to a center, even if the display unit 301 is fixed at any angle position, the position where the screen can be easily seen and which is suitable for the pen inputting operation can be assured.

Since the supporting means is expanded and contracted synchronously with the rotation, the position of the center of gravity of the display unit can be made to approach the main body. Therefore, even in the case where a large LCD or the like is used as a display unit 301, the display unit does not fall down and the stable operation can be obtained.

Further, since the guide roller 310 is provided at the lower edge of the casing 308 and, when the casing 308 moves, the guide roller 310 always supports the casing 308 from the downward position, the casing 308 can be stably held in the case where the casing 308 is fixed at an angle position during the movement.

[Third Embodiment]

The third embodiment of the invention will now be described with reference to FIGS. 19 to 22.

FIGS. 19 to 22 are side elevational views of the display apparatus and show a change in angle position of the display unit 301 in the display apparatus. In each diagram, component elements similar to those in the construction shown in FIGS. 14 to 18 of the foregoing second embodiment are designated by the same reference numerals.

Figure 19:
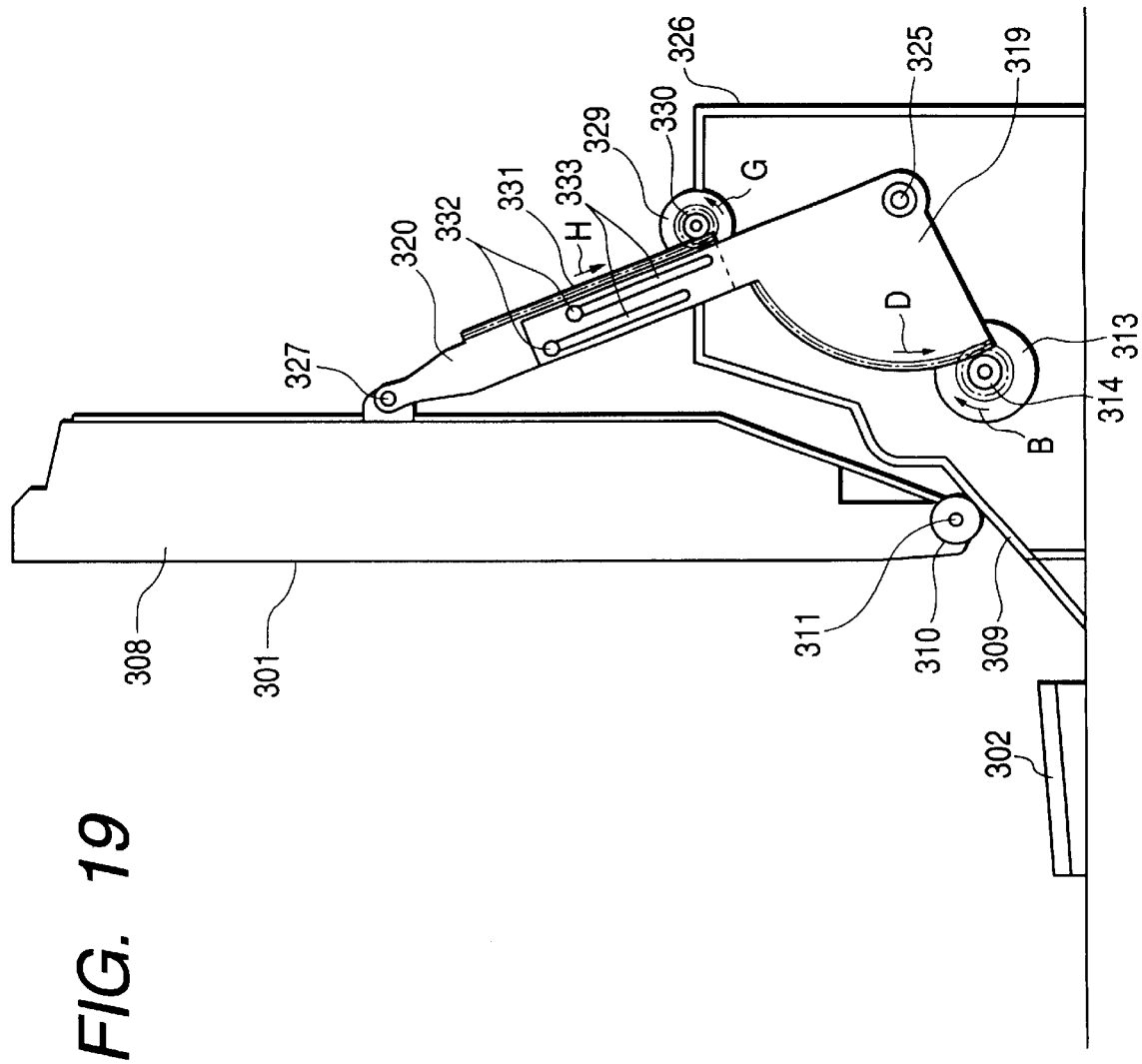
FIG. 19 is an external side elevational view showing a change in angle position of the casing including the display unit in a display apparatus according to the third embodiment of the invention.

In FIG. 19, two pin grooves 333 are formed on the pole 320. A convex portion 319a for connection to the pole 320 is formed on the main gear 319. The main gear 319 is connected to the pole 320 by pins 332. The pin 332 can move by being guided to the pin groove 333. A rack gear 331 is provided for the pole 320. The rack gear 331 is in engagement with a motor gear 330 and is moved by a motor 329 which rotates by using the motor gear 330 as a rotational axis.

The main gear 319 is in engagement with the motor gear 314 and is driven by the motor 313 directly connected to the motor gear 314 and rotates by using the main gear axis 325 as a rotational axis.

In the above construction, when a current is supplied to the motor 313 and the motor 313 starts to rotate in the direction shown by the arrow B, its rotation is transferred to the motor gear 314 directly connected to the motor 313, so that the motor gear 314 rotates. When the motor gear 314 rotates, the main gear 319 rotates in the direction of the arrow D by using the main gear axis 325 as a rotational axis. Thus, the operation of the pole 320 is restricted by the pins 332 and pin grooves 333 and the pole 320 starts the rotation.

Simultaneously with the start of the operation of the pole 320, the motor 329 starts to rotate in the direction shown by an arrow G and the motor gear 330 directly connected to the motor 329 starts the rotation. The pole 320 starts to move in the direction of an arrow H by the rack gear 331 which is in engagement with the motor gear 330. By such an operation, the distance between the main gear axis 325 and fulcrum 327 is gradually reduced. Thus, the position of the casing 308 enclosing the display unit 301 is moved and the display apparatus changes from the state shown in FIG. 19 to the state shown in FIG. 20.

During the movement, the guide roller 310 rotates while supporting the casing 308 by the lower edge and moves along the guide plate 309. For a period of time during which the display unit 301 moves from the state of FIG. 19 to the state of FIG. 20, the operator needs to execute operations for allowing the keyboard 302 to pass through a space under the casing 308 and for enclosing it into the stand cover 326. Thus, when the casing 308 moves downward by the guide roller 310, it can move without any obstacle such as a keyboard 302.

Figure 20:
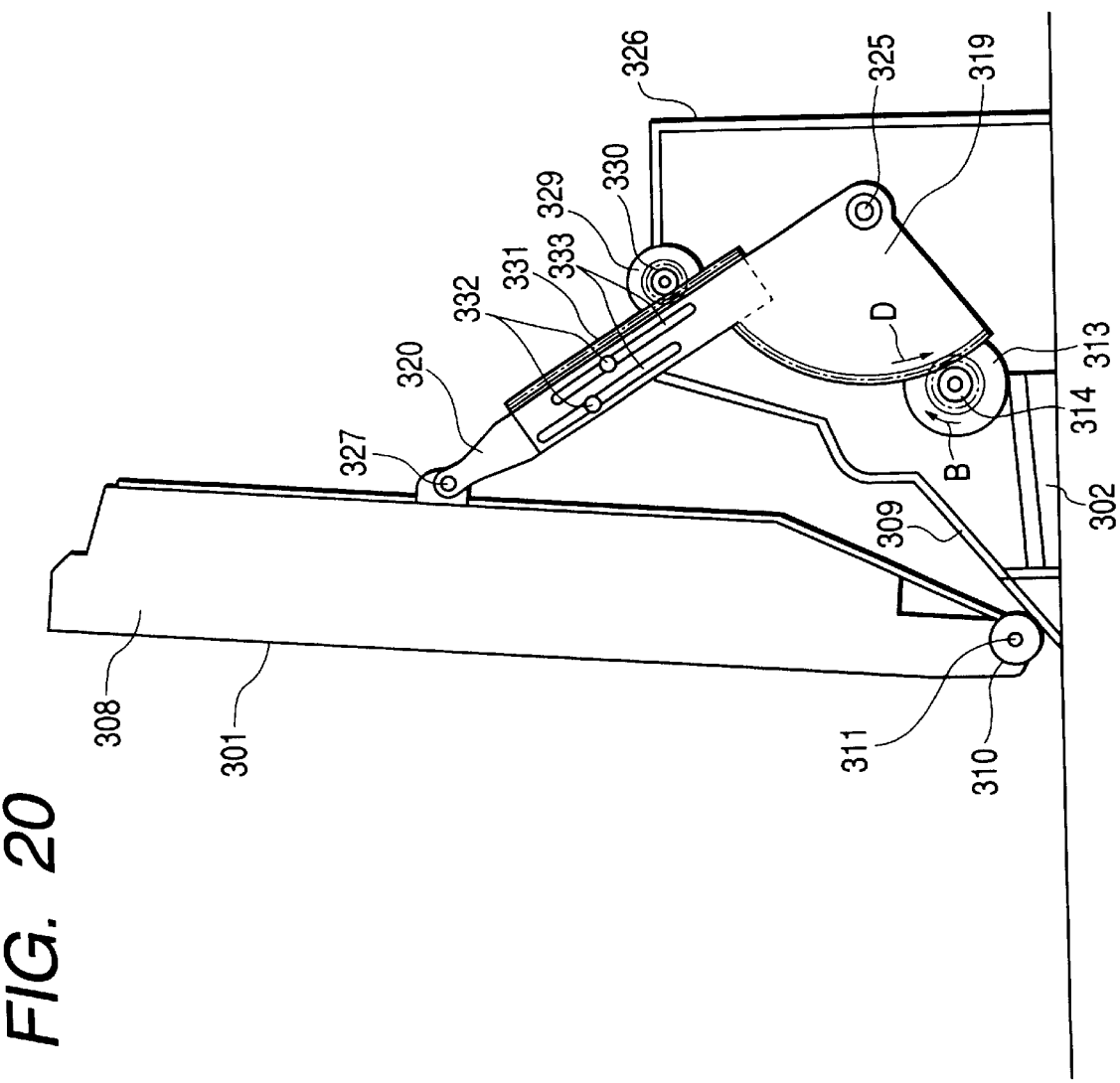
FIG. 20 is an external side elevational view showing a change in angle position of the casing including the display unit in the display apparatus according to the third embodiment.
Figure 21:
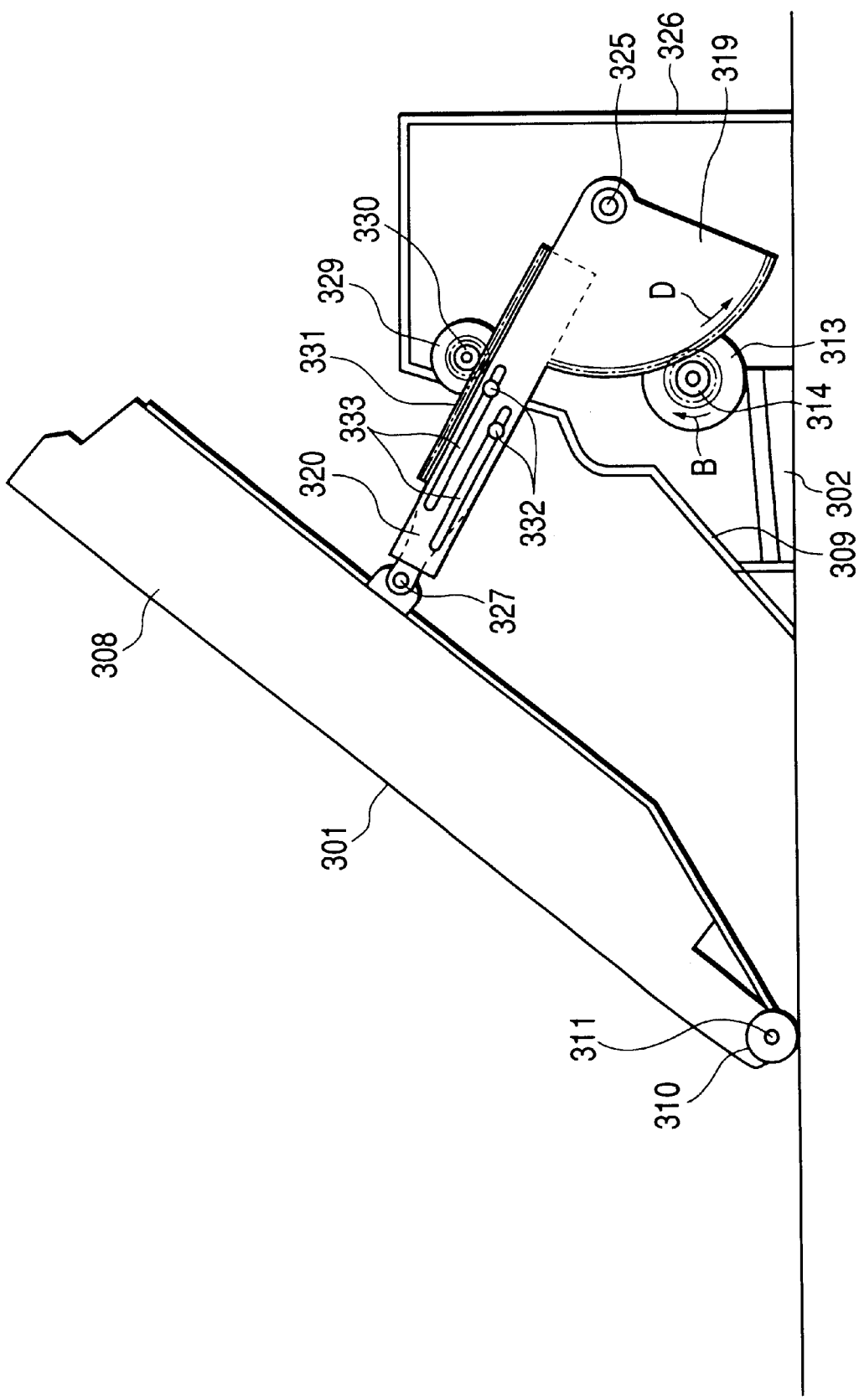
FIG. 21 is an external side elevational view showing a change in angle position of the casing including the display unit in a display apparatus according to the third embodiment of the invention.

When the motor gear 314 further rotates from a state of FIG. 20 and the position of the display unit 301 moves, a state shown in FIG. 21 is derived. At this time point, the distance between the fulcrum 327 and main gear axis 325 becomes shortest. The motor 329 starts to rotate in the direction opposite to the rotating direction so far by a switch (not shown). The guide roller 310 continues the rotation and is moved further forward along the guide plate 309.

Figure 22:
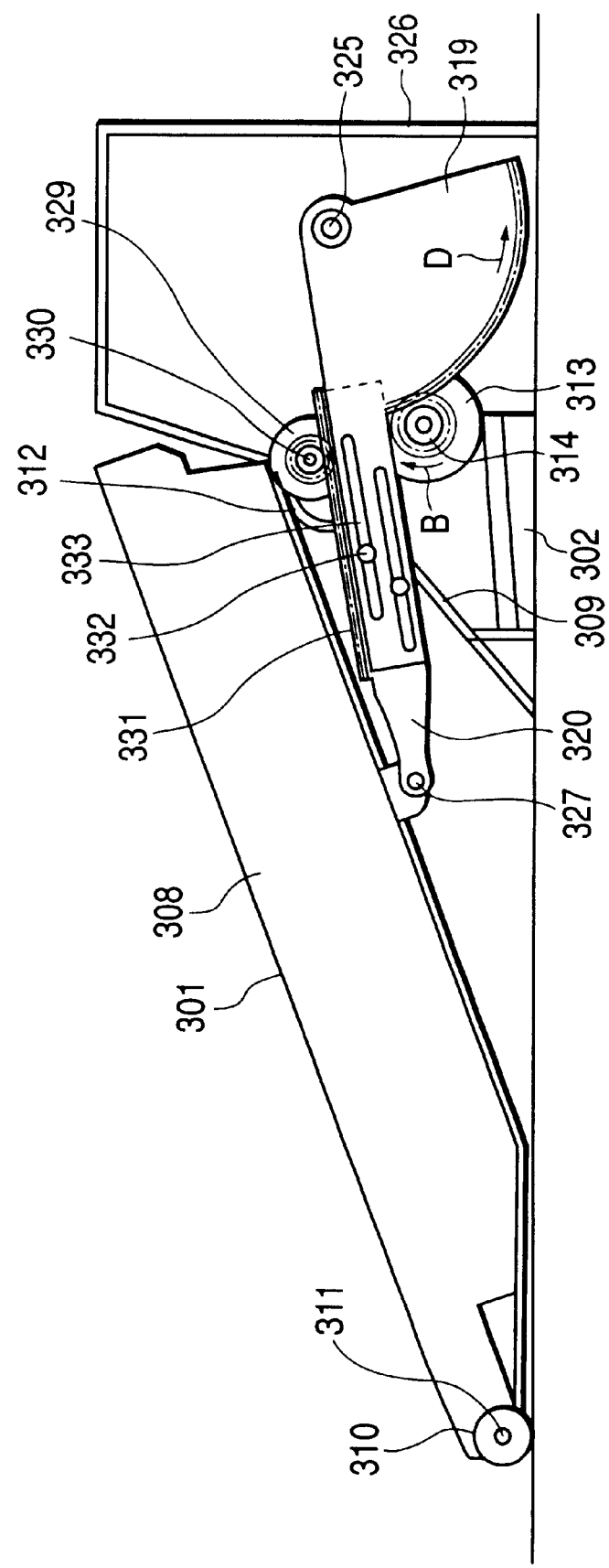
FIG. 22 is an external side elevational view showing a change in angle position of the casing including the display unit in the display apparatus according to the third embodiment.

FIG. 22 shows a state in which the casing 308 exists at the maximum angle position where an angle between the display apparatus main body 303 and casing 308 becomes maximum. In this state, the stopper 312 functions as a stopper of the upper portion of the casing 308 and prevents the whole display apparatus from falling down in the case where a pressing force is applied to the display unit 301 by the input pen 304 or the like. The distance between the fulcrum 327 and main gear axis 325 is longer as compared with those in the states shown in FIGS. 20 and 21. That is, the supporting means comprising the pole 320 operates so as to expand or contract synchronously with the movement of the casing 308.

In this state, when the current supply to the motor 313 is shut off by a switch (not shown), the rotation of the motor gear 314 is stopped, the rotation of the main gear 319 is also stopped, and the expansion and contraction and the movement of the supporting means are also stopped. Therefore, the position of the casing 308 is fixed.

When a switch (not shown) is again depressed and the current supply to the motor 313 is started, the casing 308 enclosing the display unit 301 starts to move toward the minimum angle position where the angle between the main body 303 of the display apparatus and casing 308 becomes minimum.

Between the minimum angle position and the maximum angle position, by depressing a switch (not shown) and shutting off the current supply to the motor 313, the expansion and contraction and rotation of the supporting means can be stopped and the position of the casing 308 at an arbitrary angle position can be fixed.

According to the embodiment as described above, the position of the casing 308 can be fixed at an arbitrary angle position by controlling the current supply to the motor 313.

Since the display unit 301 always rotates along almost an arc shape in which the eyes of the operator are set to a center, even if the display unit 301 is fixed at any angle position, the position where the screen can be easily seen and which is also suitable for the pen inputting operation can be assured.

Since the pins 332 and pin grooves 333 are used and the supporting means are expanded and contracted for the gear axis 325, the distance between the casing 308 and main body 303 is variable. Thus, since the position of the center of gravity of the display unit can be made to approach the main body, even in case of using a large display apparatus as a display unit 301, the display unit does not fall down and the stable operation can be obtained.

[Fourth Embodiment]

The fourth embodiment will now be described with reference to FIGS. 23A to 23D, 24A, 24B, 25A, 25B and 26.

FIGS. 23A to 23D are diagrams showing a construction of the display apparatus according to the invention.

Figure 23A:
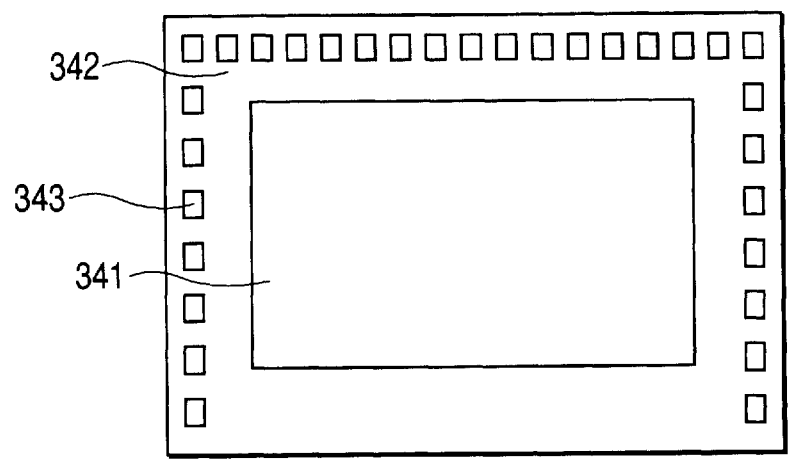
FIGS. 23A, 23B, 23C and 23D are diagrams showing a construction of a display apparatus according to the fourth embodiment of the invention.
Figure 23B:
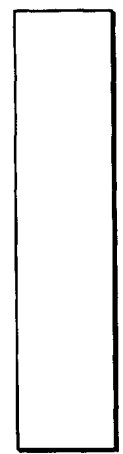
Figure 23C:
Figure 23D:
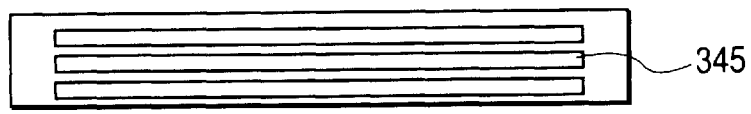

In FIG. 23A, reference numeral 341 denotes a display unit made of a liquid crystal display panel or the like. Reference numeral 342 indicates a casing enclosing the display unit 341 therein. A plurality of heat radiating holes 343 are formed on the display surface side of the casing 342. FIGS. 23B, 23C, and 23D show a side elevational view, a top view, and a bottom view of the casing 342, respectively. As shown in FIGS. 23C and 23D, a plurality of heat radiating holes 344 and 345 are formed in the upper surface and the lower surface, respectively.

Figure 24A:
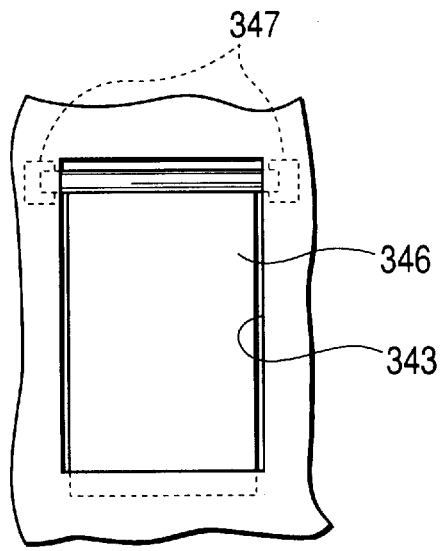
FIGS. 24A and 24B are partial enlarged diagrams of radiating holes shown in FIGS. 23A to 23D.
Figure 24B:
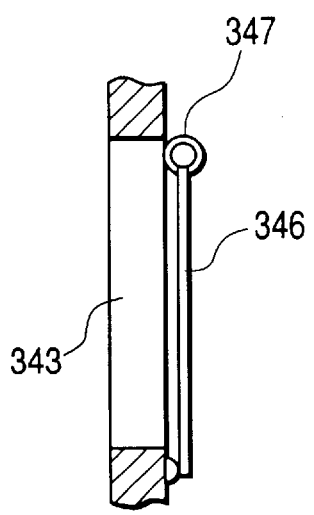
Figure 25A:
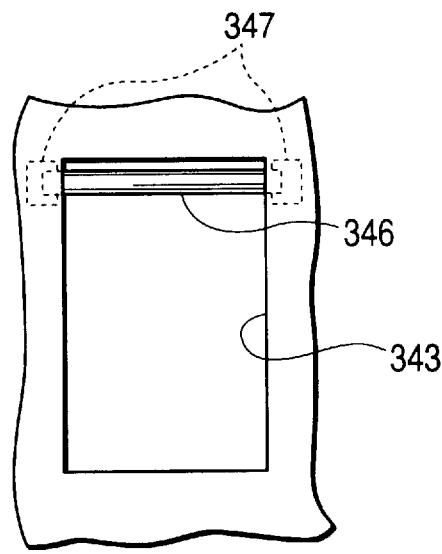
FIGS. 25A and 25B are partial enlarged diagrams of radiating holes shown in FIGS. 23A to 23D.
Figure 25B:
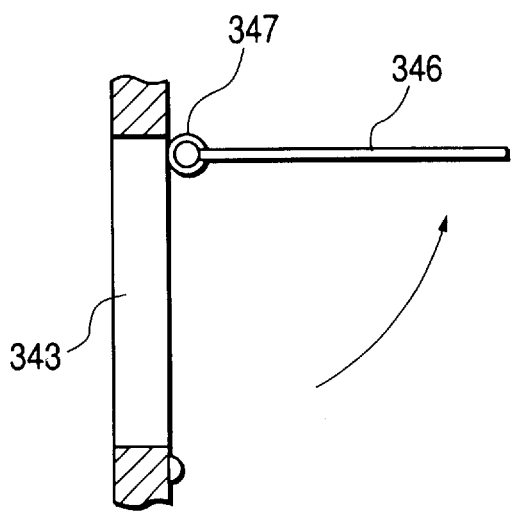

FIGS. 24A, 24B, 25A, and 25B are partially enlarged diagrams of the radiating hole 343 shown in FIG. 23A. In the diagrams, reference numeral 346 denotes a fin which is rotatably supported by a fulcrum 347. FIGS. 24A and 24B show a state in which the fin 346 chokes the radiating hole 343. FIGS. 25A and 25B show a state in which the fin 346 opens the radiating hole 343.

In the above construction, when a power switch (not shown) is operated and a current flows in the display unit 301, heat is generated in the display unit 301 and its driving circuit (not shown), so that a temperature in the casing 342 rises.

Figure 26:
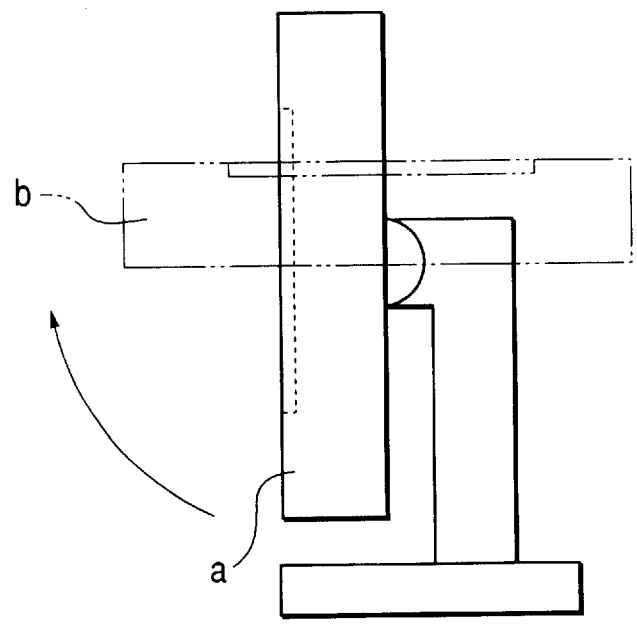
FIG. 26 is a diagram showing a position of the casing including the display unit in a using state.

FIG. 26 is a diagram showing the position of the casing 342 when the casing 342 is in a using state. When the casing 342 vertically stands (position a), as shown in FIGS. 24A and 24B, the fin 346 chokes the radiating hole 343 by the self weight. Therefore, the air warmed in the casing 342 is exhausted from the radiating holes 344. The cold air outside of the casing 342 is introduced from the radiating holes 345 due to a drop of an atmospheric pressure in the casing 342 by the air exhaustion.

When the casing 342 is moved in the direction shown by an arrow and is laid almost horizontally (position b), as shown in FIGS. 25A and 25B, the fin 346 rotates by the self weight around the fulcrum 347 as a center and is located at a position that is perpendicular to the radiating hole 343, thereby opening the radiating hole 343. In this case, the warmed air in the casing 342 is exhausted from the radiating hole 343 and due to a drop of the atmospheric pressure in the casing 342 by the air exhaustion, the cold air out of the casing 342 is introduced from the radiating holes 344 and 345. Thus, the temperature in the casing 342 is held almost constant by the continuous introduction of the outside air.

That is, even when the casing 342 exists at any angle position, it is an important point that the warmed air is efficiently exhausted from the inside of the casing 342. For this purpose, it is necessary to always set the radiating hole into the upper portion perpendicular to the casing 342 so as to trace the flow of the air.

As described above, according to the embodiment, since the radiating hole 343 in the front surface of the casing is opened or closed by the self weight of the fin 346 due to the inclination of the casing 342, an amount of air flowing in the casing 342 and a channel of the air can be controlled. That is, by a simple construction such that the fin whose angle is changed in accordance with an inclination angle of the casing 342 is provided, the flow amount and channel of the air in the casing 342 are changed and the change in temperature in the casing 342 due to a difference of the inclination can be suppressed.

[Fifth Embodiment]

The fifth embodiment of the invention will now be described with reference to FIGS. 27 and 28.

Figure 27:
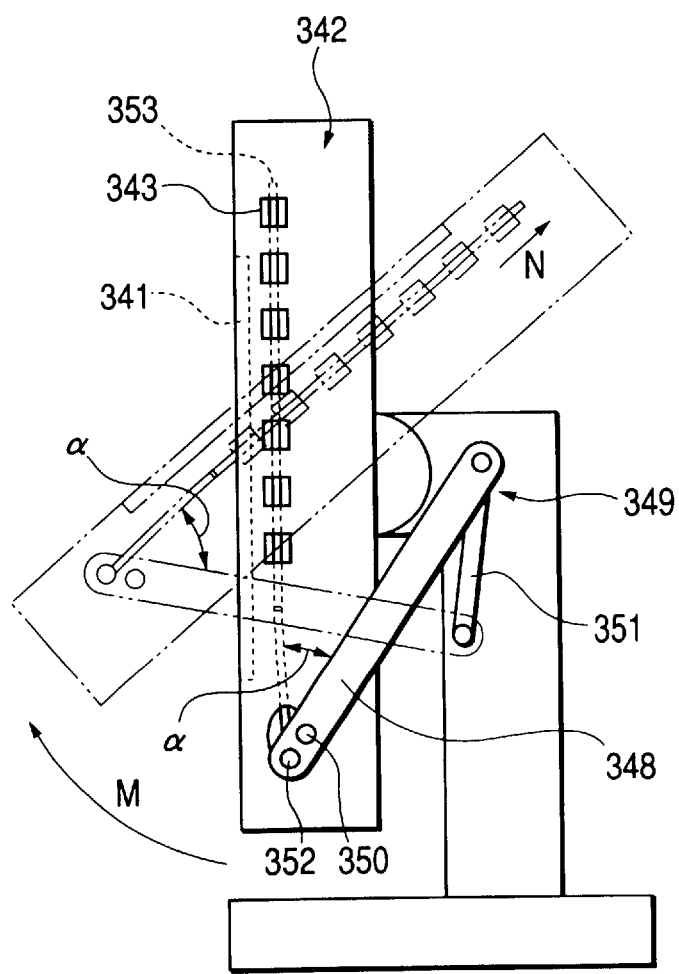
FIG. 27 is an external side elevational view showing a construction of a display apparatus according to the fifth embodiment of the invention.

FIG. 27 is an external side elevational view showing a construction of a display apparatus according to the embodiment. In the diagram, reference numeral 348 denotes a lever for supporting the casing 342 so that when the angle of the casing 342 is changed, the angle position of the casing 342 is not changed by the self weight. Reference numeral 349 denotes a pole for supporting the casing 342. A fulcrum 350 for enabling the lever 348 to be rotated for the casing 342 is provided at an edge of the lever 348 on the casing 342 side. A groove 351 for enabling the lever 348 to be moved is formed on the pole 349. By providing the fulcrum 350 and groove 351, the lever 348 is rotated and moved in accordance with the inclination of the casing 342, thereby supporting the casing 342. There is an operating point 352 on the opposite side of the groove 351 of the fulcrum 350 in the lever 348. A closing lever 353 which is rotatable at the operating point 352 and is movable almost in parallel with the display unit 341 of the casing 342 is coupled to the operating point 352. A plurality of fins 346' for opening and closing the radiating holes 343 formed on the side surface of the casing 342 are rotatably connected to the closing lever 353. FIG. 28 is a diagram showing connecting relations among the closing lever 353, casing 342, and fins 346'.

In FIG. 27, when the casing 342 rotates in the direction of an arrow M and changes its inclination, the angle a between the casing 342 and lever 348 increases. When the angle a increases, the lever 348 moves in the direction of an arrow N shown in FIG. 28. By the movement of the closing lever 353, the fins 346' move in the direction to open the radiating holes 343.

According to the embodiment as mentioned above, since a flow amount of the air is controlled by operating the closing lever 353 in accordance with the angle position of the casing 342, the heat in the casing 342 can be efficiently exhausted to the outside of the casing 342.

Although the number of parts increases as compared with that in the display apparatus shown in the foregoing third embodiment, the fins 346' can be forcedly rotated. Since the high machining precision when forming the fulcrum 347 and the axial portion of the fin 346 for rotating the fin 346 by the self weight as in the third embodiment is unnecessary, when there are a number of fins, the costs can be also reduced.

[Sixth Embodiment]

The sixth embodiment of the invention will now be described with reference to FIG. 29.

FIG. 29 is an explanatory diagram of an opening/closing mechanism of the radiating hole 343 which is used in a display apparatus according to the embodiment.

In the diagram, a closing lever 353' has an opening portion 354 of the same shape as that of the opposite radiating hole 343. The closing lever 353' is attached so that the opening portion 354 is movably closely adhered to the radiating hole 343.

In the display apparatus having such an opening/closing mechanism, when the closing lever 353' moves in the direction of the arrow N by a change in inclination angle of the casing 342, the matching position of the radiating hole 343 and opening portion 354 changes and a numerical aperture of the opening portion is changed.

According to the embodiment as mentioned above, since the flow amount of the air is controlled by operating the closing lever 353' in accordance with the angle position of the casing 342, the heat in the casing 342 can be efficiently exhausted to the outside of the casing 342 and the temperature change in the casing 342 can be suppressed. Since it is unnecessary to provide the fins as shown in the fourth and fifth embodiments, the costs can be further reduced.

[Seventh Embodiment]

The seventh embodiment of the invention will now be described with reference to FIGS. 30A to 30C, 31 and 32.

Figure 30A:
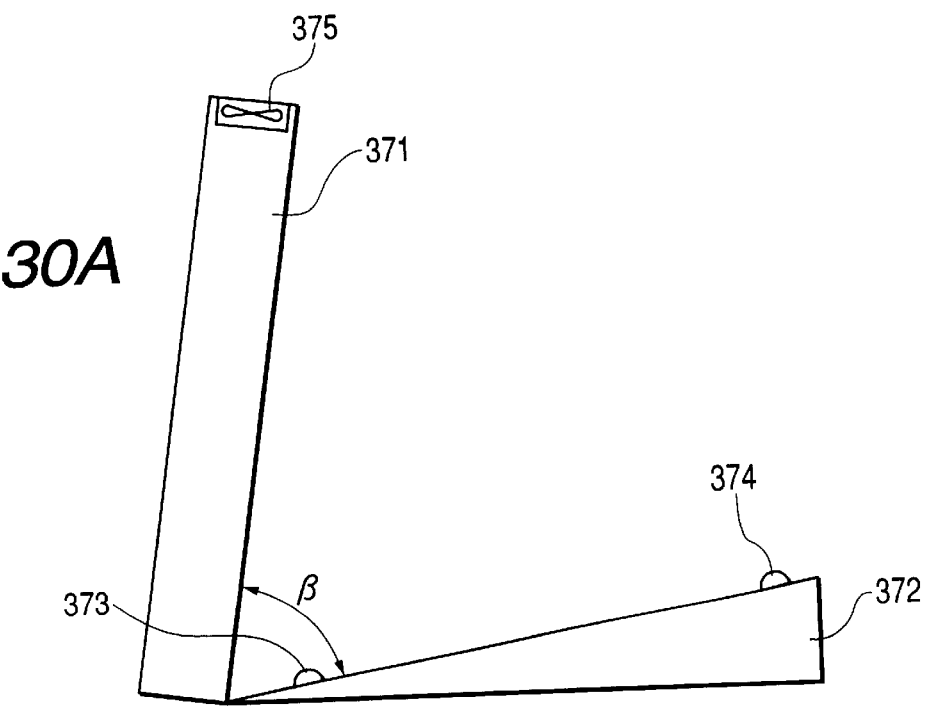
FIGS. 30A, 30B and 30C are external side elevational views showing a construction of a display apparatus and its operating state according to the seventh embodiment of the invention.
Figure 30B:
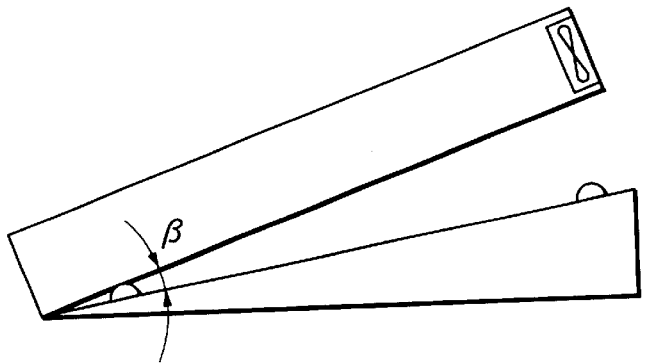
Figure 30C:
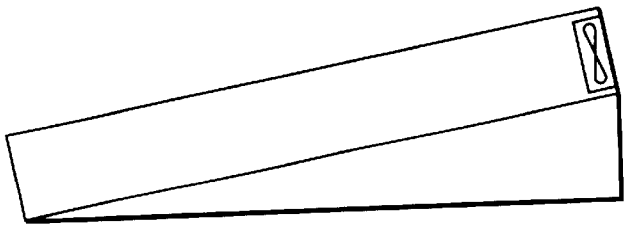

FIGS. 30A to 30C are external side elevational views showing a construction of a display apparatus and its operating state according to the embodiment. In FIG. 30A, reference numeral 371 denotes a casing enclosing a display unit made of a liquid crystal panel; 372 a stand for rotatably supporting the casing 371; and 373 and 374 switches which are turned on/off in accordance with the angle β between the casing 371 and stand 372. That is, each of the switches 373 and 374 constructs detecting means for detecting an inclination of the casing 371. Reference numeral 375 denotes a fan for exhausting the air from the inside of the casing 371 to the outside by rotating. An inclination angle of the casing 371 sequentially decreases from the state of FIG. 30A to the state of FIG. 30B and, further, to the state of FIG. 30C.

Figures 31, 32:
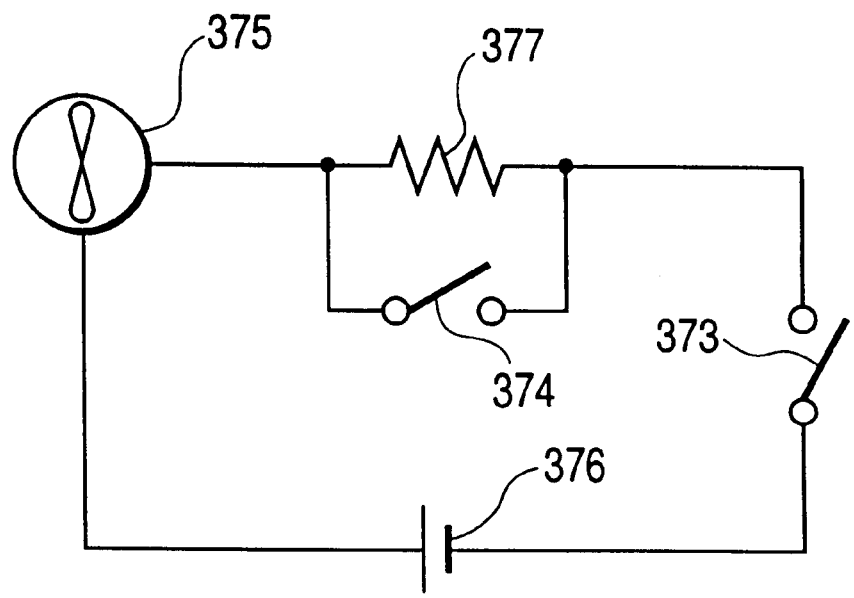
FIG. 31 is a circuit diagram showing a power supply circuit for rotating a fan shown in FIGS. 30A to 30C.
FIG. 32 is a diagram showing relations among the position of the casing, conducting states of switches, and a driving state of the fan shown in FIGS. 30A to 30C.

FIG. 31 is a circuit diagram showing a power supply circuit for rotating the fan 375. In the diagram, reference numeral 376 denotes a power source for driving the fan and 377 indicates a resistor which is connected in parallel with the switch 374.

In the above construction, when a current is supplied to the display unit by a power source (not shown), heat is generated in the display unit and a driving circuit (not shown) for a display of the display unit, so that the temperature in the casing 371 rises.

When the casing 371 stands perpendicularly to the stand as shown in FIG. 30A, both of the switches 373 and 374 are OFF, the fan 375 does not rotate, and the air warmed by the heat in the casing 371 flows from the lower portion to the upper portion due to a natural convection and is exhausted from an opening portion (not shown) provided in the upper portion of the casing 371.

When the angle β between the casing 371 and stand 372 gradually decreases and the casing reaches the position shown in FIG. 30B, the switch 373 is turned on, the switch 374 is turned off, the current flows in the fan 375, and the fan 375 rotates. That is, as the angle β decreases, the natural convection in the casing 371 becomes hard to occur. Since it is difficult to exhaust the warmed air, an increase in temperature in the casing 371 can be prevented.

When the angle β further decreases and the casing reaches the position shown in FIG. 30C, both of the switches 373 and 374 are turned on, a further large current flows to the fan 375, and a rotational speed of the fan 375 increases. That is, when the casing reaches the position of FIG. 30C, the exhaustion of the air by the natural convection in the casing 371 can hardly be expected, so that the exhaustion is forcedly performed.

FIG. 32 is a diagram showing relations among the position of the casing 371, conducting states of the switches 373 and 374, and a driving state of the fan 375.

According to the embodiment described above, the inclination of the casing 371 is detected by the switches 373 and 374, the rotational speed of the fan 375 is changed in accordance with the detection result, and the amount of air flowing in the casing 371 is controlled, so that an increase in temperature in the casing 371 can be suppressed.

[Eighth Embodiment]

The eighth embodiment of the invention will now be described with reference to FIGS. 33A to 33C, 34 and 35.

Figure 33A:
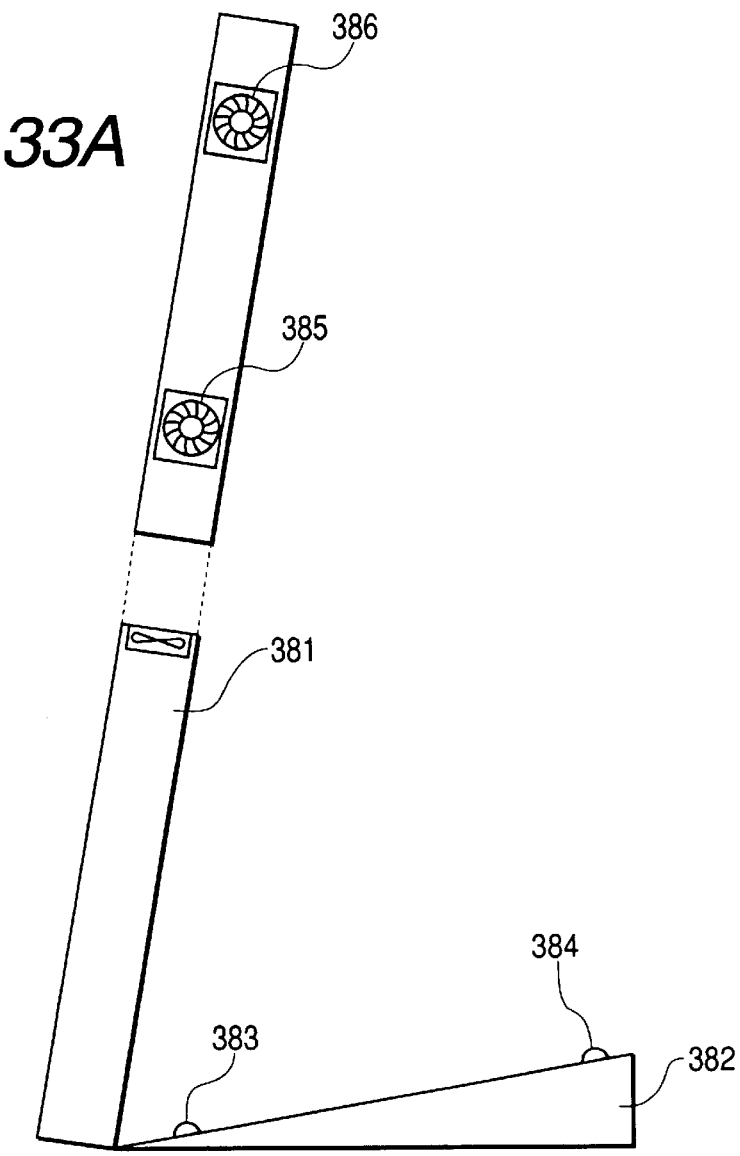
FIGS. 33A, 33B and 33C are external side elevational views showing a construction of a display apparatus and its operating state according to the eighth embodiment of the invention.
Figure 33B:
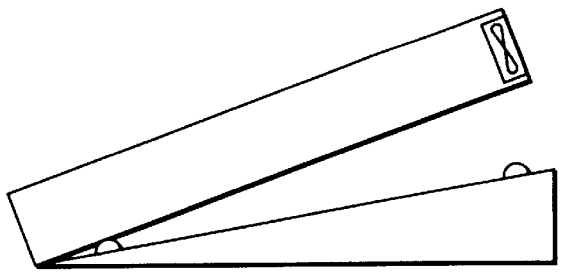
Figure 33C:
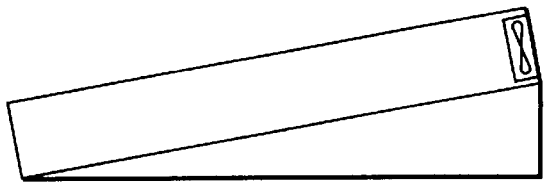

FIGS. 33A to 33C are external side elevational views showing a construction of a display apparatus and its operating state according to the embodiment. In FIG. 33A, reference numeral 381 denotes a casing enclosing a display unit made of a liquid crystal panel; 382 a stand for rotatably supporting the casing 381; and 383 and 384 switches which are turned on/off in accordance with the angle β between the casing 381 and stand 382. That is, each of the switches 383 and 384 constructs detecting means for detecting an inclination of the casing 381. Reference numerals 385 and 386 denote fans for exhausting the air from the inside of the casing 381 to the outside by rotating. An inclination angle of the casing 381 sequentially decreases from the state of FIG. 33A to the state of FIG. 33B and, further, to the state of FIG. 33C.

Figures 34, 35:
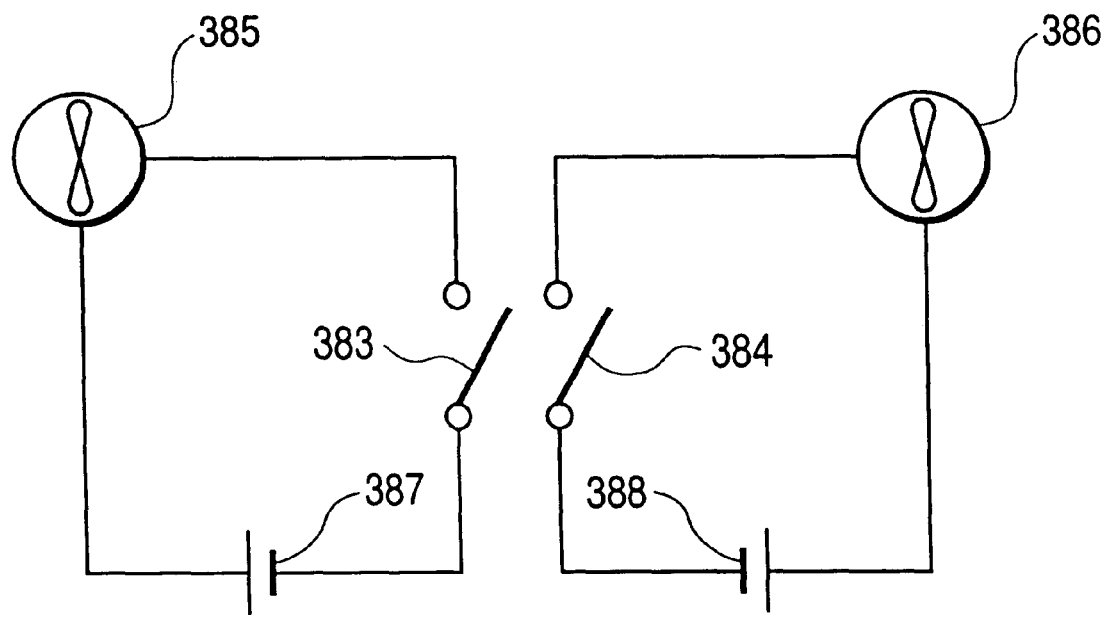
FIG. 34 is a circuit diagram showing a power supply circuit for rotating a fan shown in FIGS. 33A to 33C.
FIG. 35 is a diagram showing relations among the position of a casing, conducting states of switches, and the number of fans to be driven shown in FIGS. 33A to 33C.

FIG. 34 is a circuit diagram showing a power supply circuit for rotating the fan 385. In the diagram, reference numeral 387 denotes a power source for driving the fan 385 and 388 indicates a power source to drive the fan 386. The power sources 387 and 388 are connected to the fans 385 and 386, respectively.

In the above construction, when the casing 381 stands perpendicularly to the stand as shown in FIG. 33A, since both of the switches 383 and 384 are OFF, both of the fans 385 and 386 do not rotate. In this instance, the air warmed by the heat in the casing 381 flows from the lower portion to the upper portion due to a natural convection and is exhausted from an opening portion (not shown) provided in the upper portion of the casing 381.

When the angle β between the casing 381 and stand 382 gradually decreases and the casing reaches the position shown in FIG. 33B, the switch 384 is held OFF and the switch 383 is turned on. Thus, it is possible to prevent an inconvenience such that the current flows in the fan 385 and the fan 385 rotates. That is, as the angle β decreases, the natural convection in the casing 381 becomes hard to occur. Since it is difficult to exhaust the warmed air, an increase in temperature in the casing 381 can be prevented.

When the angle β further decreases and the casing reaches the position shown in FIG. 33C, both of the switches 383 and 384 are turned on and both of the fans 385 and 386 rotate. That is, when the casing reaches the position of FIG. 33C, the exhaustion of the air by the natural convection in the casing 381 can hardly be expected, so that the exhaustion is forcedly performed.

FIG. 35 is a diagram showing relations among the position of the casing 381, conducting states of the switches 383 and 384, and the number of fans to be driven.

According to the embodiment described above, the inclination of the casing 381 is detected by the switches 383 and 384, the number of fans to be driven is changed in accordance with the detection results, and the amount of air and the channel of the air flowing in the casing 381 is controlled, so that an increase in temperature in the casing 381 can be further efficiently suppressed.

[Ninth Embodiment]

The ninth embodiment of the invention will now be described with reference to FIGS. 36A and 36B.

Figure 36A:
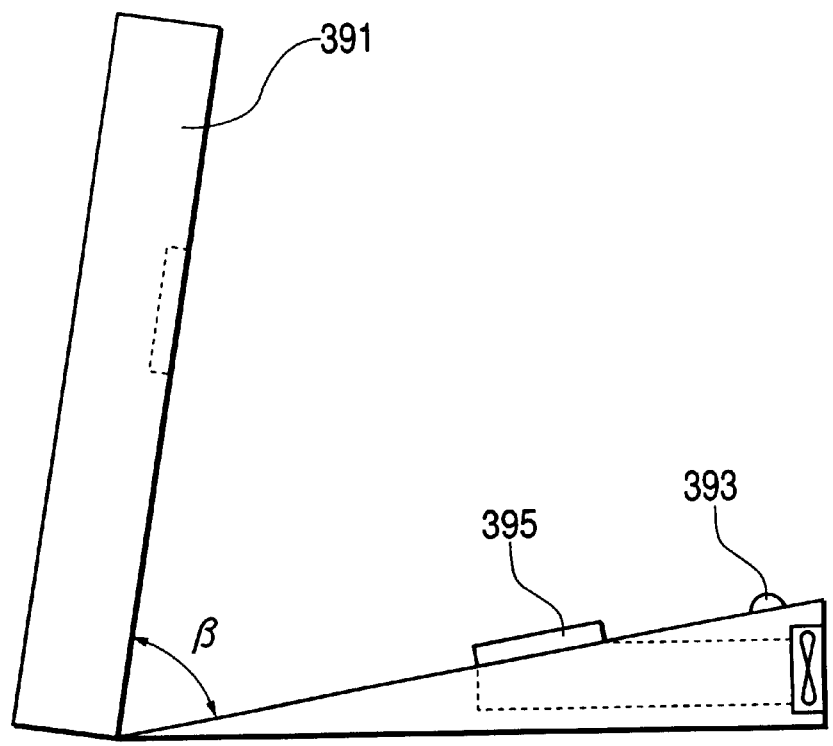
FIGS. 36A and 36B are external side elevational views showing a construction of a display apparatus and its operating state according to the ninth embodiment of the invention.
Figure 36B:
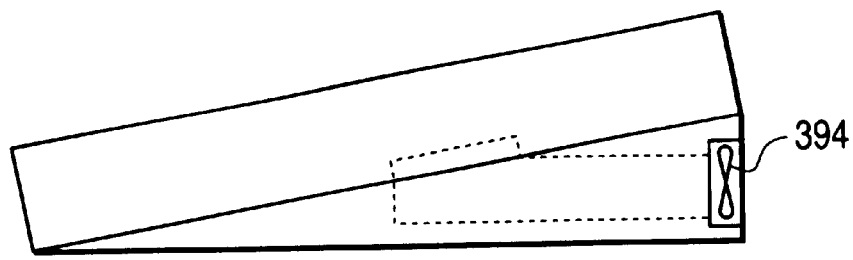
Figure 37:
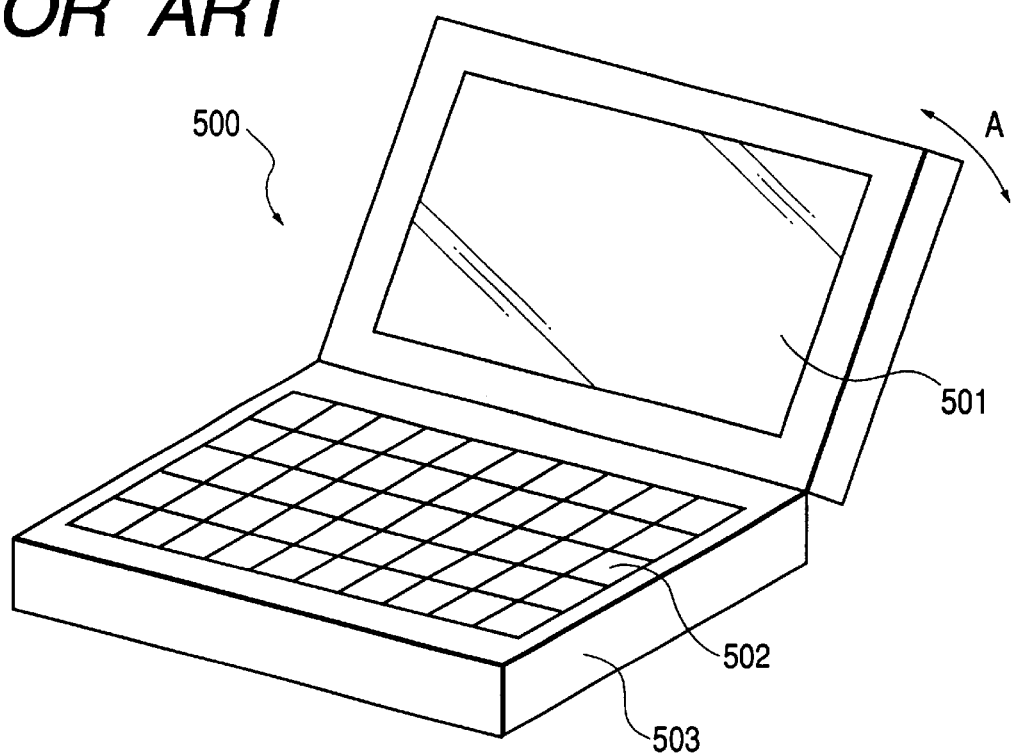
FIG. 37 is an external perspective view showing a construction of a conventional display apparatus.
Figure 38:
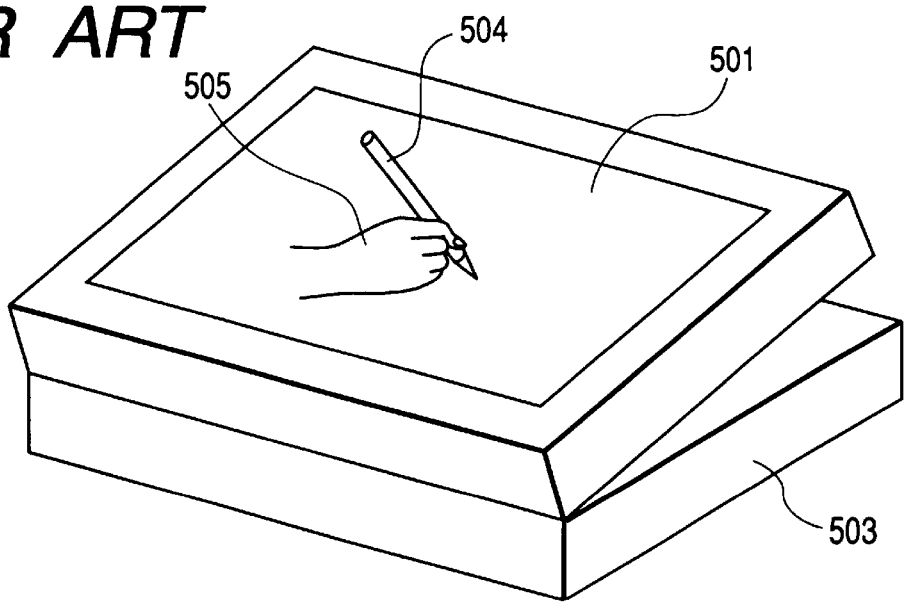
FIG. 38 is an external perspective view showing one form when the conventional display apparatus is used.
Figure 39:
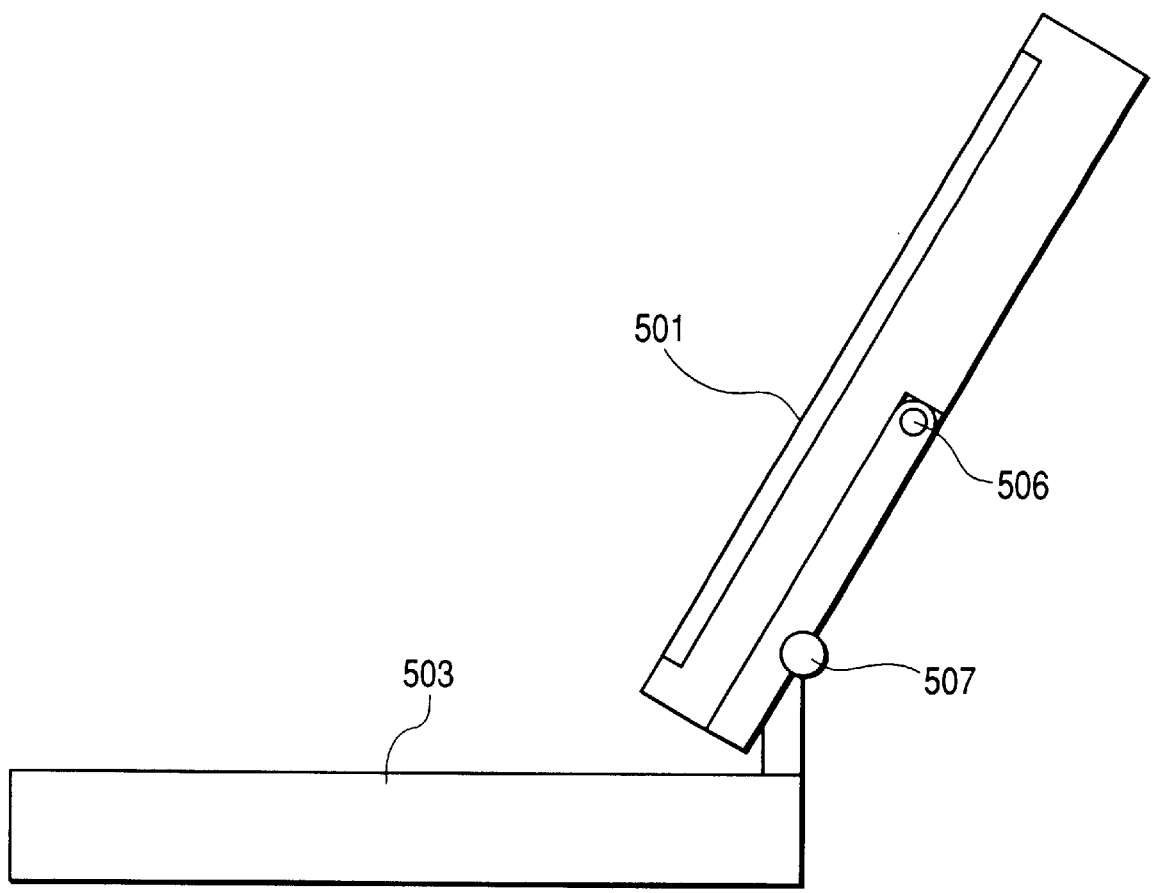
FIG. 39 is a diagram for explaining a change in form of the conventional display apparatus.
Figure 40:
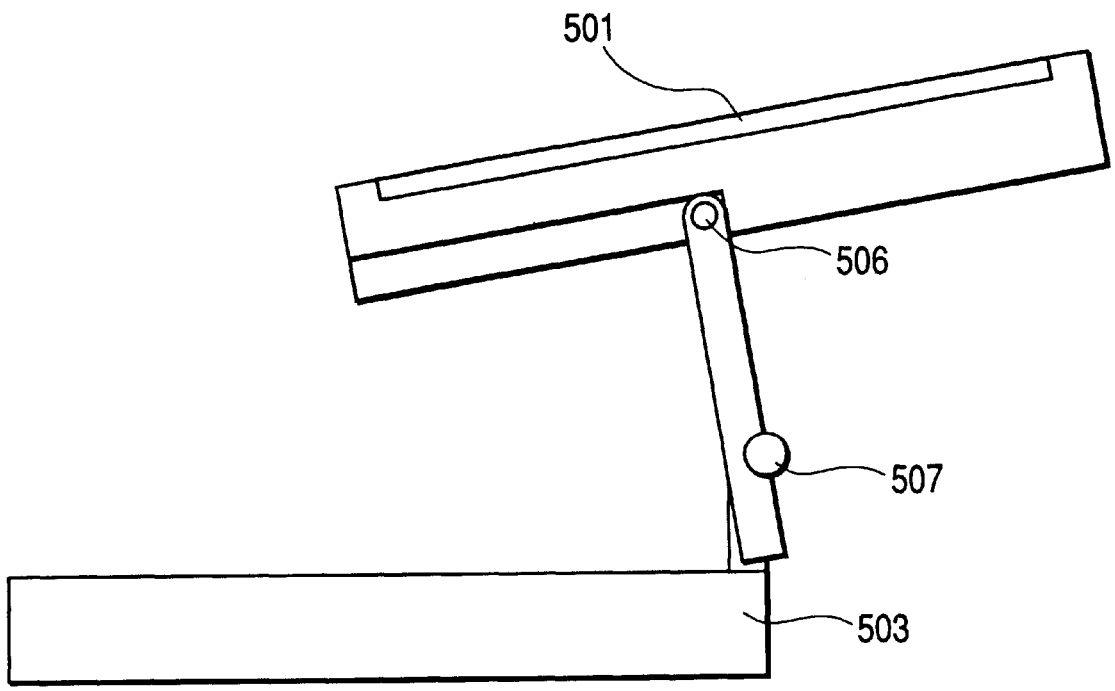
FIG. 40 is a diagram for explaining a change in form of the conventional display apparatus.
Figure 41:
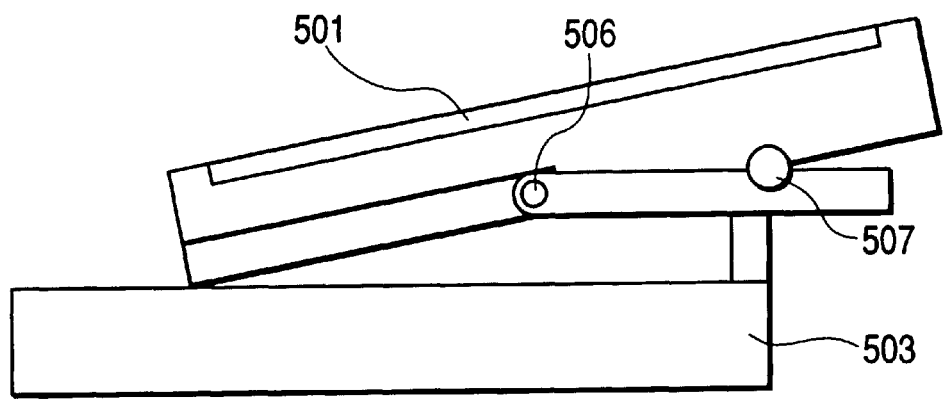
FIG. 41 is a diagram for explaining a change in form of the conventional display apparatus.

FIGS. 36A and 36B are external side elevational views showing a construction of a display apparatus and its operating state according to the embodiment. In FIG. 36A, reference numeral 391 denotes a casing enclosing a display unit made of a liquid crystal panel; 392 a stand for rotatably supporting the casing 391; and 393 a switch which is turned on/off in accordance with the angle β between the casing 391 and stand 392. That is, the switch 393 constructs detecting means for detecting an inclination of the casing 391.

An exhaust duct 395 is provided in the stand 392 and a fan 394 is provided at one end thereof. A convex portion 392a which is directly connected to the other end of the exhaustion duct 395 is provided on the surface (rear surface) of the stand 392 which comes into contact with the casing 391. A concave portion 391a is formed in the portion of the casing 391 which faces the convex portion 392a.

In the above construction, when the angle β between the casing 391 and stand 392 sequentially decreases and the casing reaches the position shown in FIG. 36B, the switch 394 is turned on, so that the fan 393 starts to rotate. In this instance, the rear surface of the casing 391 is in contact with the stand 392 and the casing is in a state where the convex portion 392a is inserted in the concave portion 391a. Therefore, the warmed air in the casing 391 is exhausted to the outside of the casing 391 via the exhaust duct 395.

According to the embodiment as mentioned above, when the inclination of the casing 391 is detected by the switch 393, the fan is driven and the warmed air is exhausted to the outside of the casing 391, so that the temperature increase in the casing 391 can be efficiently suppressed.

Since no fan is provided in the casing 391, a thickness in size and a light weight of the casing can be realized.

According to the display apparatus of the embodiment as described above, in the display apparatus comprising the moving unit having therein the display means for displaying information and a base unit having the supporting means for rotatably supporting the moving unit, the supporting position control means for controlling the supporting means to an arbitrary position is provided, so that an advantage such that the moving unit can be used at an arbitrary angle position is derived.

According to the display apparatus of the embodiment, since the supporting means is expanded and contracted synchronously with the rotation of the moving unit, the position of the center of gravity of the display means can be made to approach the base portion. Therefore, even in case of using relatively large display means, advantages such that the display apparatus does not fall down and the stable operation can be obtained are derived.

According to the display apparatus of the embodiment, since the control means for controlling the expansion and contraction of the supporting means is provided, an advantage such that the further stable operation can be obtained is derived.

According to the display apparatus of the invention, since the lower supporting means for supporting the moving unit at the lower position of the moving unit is provided, an advantage such that the moving unit can be stabilized when the moving unit is fixed at an angle position during the movement is derived.

According to the display apparatus of the embodiment, the supporting means is expanded or contracted between the maximum inclination angle position and the minimum inclination angle position for the supporting means of the moving unit in a manner such that the display surface of the display means faces the eyes of the operator who sees the display means, so that an advantage such that even if the moving unit is fixed at any angle position, the position where the screen can be easily seen and which is suitable for the pen inputting operation or the like can be assured is derived.

According to the display apparatus of the embodiment, the moving unit comprises the opening portion formed on the moving unit and the air rectifying means that is closable in accordance with the inclination angle of the moving unit for the supporting means at the position where the moving unit faces the opening portion, so that an advantage such that the flow amount of air and the channel of the air in the moving unit are changed and the temperature change in the moving unit due to a difference of the inclination can be suppressed by the simple construction is derived.

According to the display apparatus of the embodiment, an advantage such that the air rectifying means changes the amount of air and the channel of the air in the moving unit are changed and the temperature change in the moving unit due to the difference of the inclination can be suppressed by the simple construction such that the air rectifying means is rotated by the self weight is obtained.

According to the display apparatus of the embodiment, since the control means for controlling the numerical aperture of the opening portion in accordance with the inclination angle of the moving unit for the supporting means is provided, an advantage such that the temperature change in the moving unit can be efficiently suppressed in accordance with the inclination angle of the moving unit is derived.

According to the display apparatus of the embodiment, since the detecting means for detecting the inclination angle of the moving unit for the supporting means, the exhausting means for exhausting the air in the moving unit, and the air amount control means for controlling the amount of air that is exhausted by the exhausting means are provided, an advantage such that the temperature change in the moving unit can be efficiently suppressed in accordance with the inclination angle of the moving unit is derived.

According to the display apparatus of the embodiment, since the exhausting means includes the driving means for driving the exhausting means and the air amount control means controls the driving speed of the driving means in accordance with the inclination angle detected by the detecting means, an advantage such that the temperature change in the moving unit can be efficiently suppressed in accordance with the inclination angle of the moving unit is derived.

According to the display apparatus of the embodiment, since the air amount control means includes the air channel control means for controlling the channel of the air which is exhausted by the exhausting means, an advantage such that the temperature change in the moving unit can be efficiently suppressed in accordance with the inclination angle of the moving unit is derived.

According to the display apparatus of the embodiment, since the exhausting means comprises a plurality of fans and the air channel control means selectively controls the fans to be driven in accordance with the inclination angle detected by the detecting means, an advantage such that the amount of air and the channel of the air in the moving unit are changed and the temperature change in the moving unit can be efficiently suppressed in accordance with the inclination angle of the moving unit by the simple construction is derived.

What is claimed is:

1. A display apparatus comprising:
    a flat panel display unit in which a display screen is provided on one surface;
    a first rotary arm, one end of which is rotatably, axially supported by a first axis to a rear surface of said display unit;

a second rotary arm, one end of which is rotatably, axially supported to the rear surface of said display unit by a second axis different from the first axis;

a base seat portion for rotatably, axially supporting a second end of said first rotary arm and slidably supporting a second end of said second rotary arm; and a locking mechanism for fixing said flat panel display unit, said first rotary arm and said second rotary arm at an arbitrary position, wherein said display unit performs a substantially arcuate motion around a virtual center in front of said display screen.

2. An apparatus according to claim 1, wherein said locking mechanism is set as being almost balanced to a weight of said display unit.

3. An apparatus according to claim 2, wherein said locking mechanism is a gas spring mechanism.

4. An apparatus according to claim 1, wherein said second rotary arm is slidable by rollers equipped at the second end of said second rotary arm.

5. An apparatus according to claim 1, further comprising at least one caster provided in a lower edge portion of said display unit.

6. An apparatus according to claim 1, further comprising a swiveling mechanism provided on a bottom surface of said base seat portion.

7. An apparatus according to claim 5, further comprising a swiveling mechanism is provided on a bottom surface of said base seat portion and said caster is a ball-shaped caster.

8. An apparatus according to claim 7, wherein said base seat portion comprising a circuit selected from the group consisting of at least a power supply circuit, a display signal input/output circuit, and a screen input signal input/output circuit.

9. An apparatus according to claim 8, wherein said display unit has a coordinate input function on said display screen.

10. An apparatus according to claim 1, wherein said display unit moves at angles between about 20° and about 90°.

11. A display apparatus comprising:

a flat panel display unit in which a display screen is provided on one surface;

a slider supported on a rear surface of said display unit;

a first rotary arm, one end of which is rotatably, axially supported by a first axis to said slider;

a second rotary arm, one end of which is rotatably, axially supported to said slider by a second axis different from the first axis;

a base seat portion for rotatably, axially supporting a second end of said first rotary arm and slidably supporting a second end of said second rotary arm; and a locking mechanism for fixing said flat panel display unit, said first rotary arm and said second rotary arm at an arbitrary position, wherein said display unit performs a substantially arcuate motion around a virtual center in front of said display screen.

12. An apparatus according to claim 11, wherein said locking mechanism is set as being almost balanced to a weight of the display unit.

13. An apparatus according to claim 12, wherein said locking mechanism is a gas spring mechanism.

14. An apparatus according to claim 11, wherein said second rotary arm is slidable by rollers equipped at the second end of said second rotary arm.

* * * * *

UNITED STATES PATENT AND TRADEMARK OFFICE
CERTIFICATE OF CORRECTION

PATENT NO. : 6,288,891 B1
DATED : September 11, 2001
INVENTOR(S) : Masahide Hasegawa et al.

It is certified that error appears in the above-identified patent and that said Letters Patent is hereby corrected as shown below:

Column 16,
Line 33, "angle a" should read -- angle α --.

Column 21,
Line 28, "is" should be deleted.

Signed and Sealed this

Thirtieth Day of April, 2002

*Attest:*

*Attesting Officer*

JAMES E. ROGAN
*Director of the United States Patent and Trademark Office*